(12) United States Patent
Pereira et al.

(10) Patent No.: US 8,951,668 B2
(45) Date of Patent: *Feb. 10, 2015

(54) IRON OXYFLUORIDE ELECTRODES FOR ELECTROCHEMICAL ENERGY STORAGE

(71) Applicants: Nathalie Pereira, Piscataway, NJ (US); Glenn Amatucci, Peapack, NJ (US)

(72) Inventors: Nathalie Pereira, Piscataway, NJ (US); Glenn Amatucci, Peapack, NJ (US)

(73) Assignee: Rutgers, The State University of New Jersey, New Brunswick, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/090,990

(22) Filed: Nov. 26, 2013

(65) Prior Publication Data

US 2014/0186708 A1 Jul. 3, 2014

Related U.S. Application Data

(63) Continuation of application No. 12/993,778, filed on Nov. 19, 2010, now Pat. No. 8,623,549.

(51) Int. Cl.
H01M 4/02 (2006.01)
H01M 4/1315 (2010.01)
H01M 4/62 (2006.01)

(52) U.S. Cl.
CPC ............ *H01M 4/1315* (2013.01); *H01M 4/625* (2013.01)
USPC .......................... 429/209; 429/218.1; 429/221

(58) Field of Classification Search
USPC ....................................... 429/209, 221, 218.1
See application file for complete search history.

(56) References Cited

U.S. PATENT DOCUMENTS

2007/0190414 A1* 8/2007 Amatucci et al. .......... 429/218.1

* cited by examiner

*Primary Examiner* — Jane Rhee
(74) *Attorney, Agent, or Firm* — Greenberg Traurig, LLP

(57) ABSTRACT

The present invention provides electrochemical energy storage systems comprising metallolyte composites, iron fluoride composites and iron oxyfluoride composites. The present invention further provides methods for fabricating metallolyte composites.

26 Claims, 29 Drawing Sheets

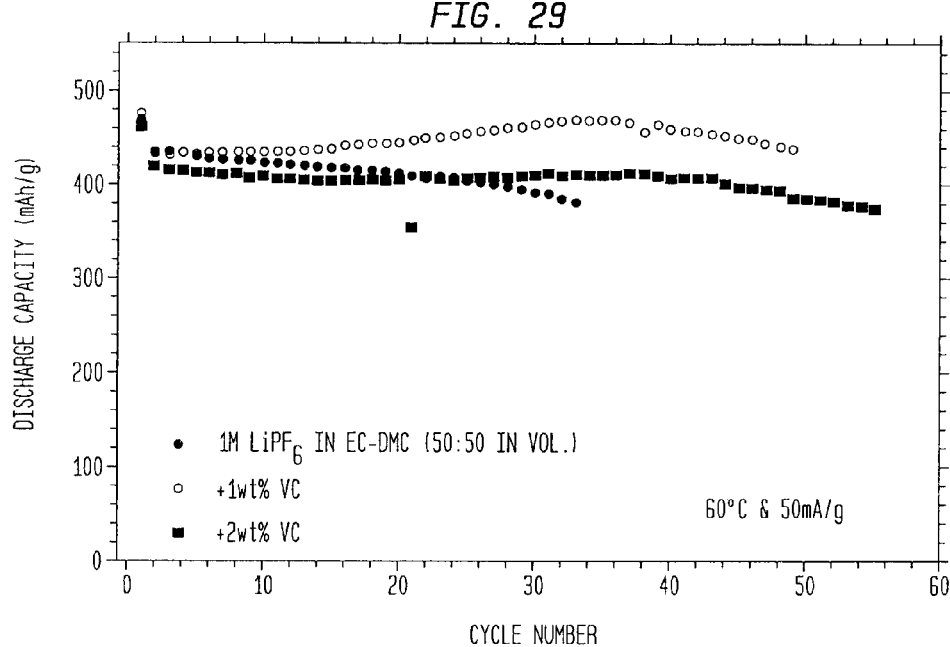
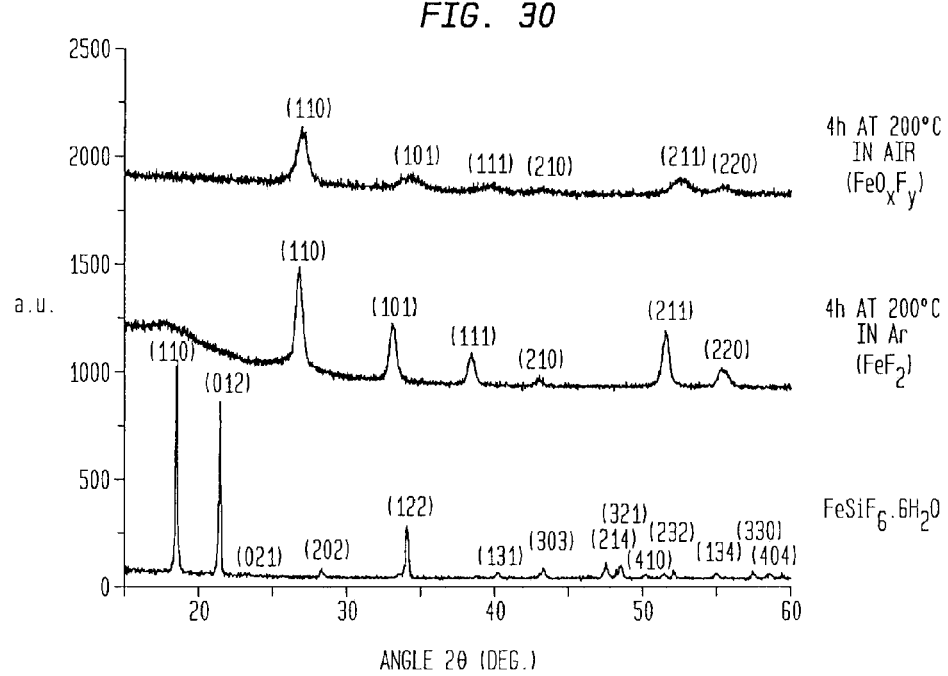

IRON OXYFLUORIDE ELECTRODES FOR ELECTROCHEMICAL ENERGY STORAGE

CROSS REFERENCE TO RELATED APPLICATIONS

This application is a continuation of U.S. Non-Provisional application Ser. No. 12/993,778 (filed Nov. 19, 2010) which is national stage entry of PCT/US09/44797 (filed on May 21, 2009), which claims the benefit of the filing date of U.S. Provisional Application No. 61/055,791 (filed May 23, 2008). The entire contents of each of these applications are incorporated herein by reference in their entirety.

STATEMENT OF GOVERNMENT FUNDING

This invention was made with U.S. government support. The government has certain rights in the invention.

FIELD OF THE INVENTION

The present invention relates to primary and secondary electrochemical energy storage systems, particularly to such systems as battery cells, which use materials that take up and release ions as a means of storing and supplying electrical energy.

BACKGROUND OF THE INVENTION

Lithium rechargeable batteries are the premier energy storage device for portable electronics applications. However, a significant need remains for the improvement of the energy density of the cells. The main limiting factor to the realization of such energy density increase is the positive electrode materials.

All lithium secondary batteries utilize positive electrodes of intercalation compounds which retain their crystal structure upon lithium insertion. The host structure remains intact even though the lattice may expand, contract or distort slightly upon $Li^+$ insertion. The transition metals present in all of the intercalation compounds are capable of multiple electron transfer and thus higher capacity, however, the limited lithium vacancies inhibit the incorporation of more lithium and thus the charge transfer of more electrons to the structure. Further, the covalency of the transition metal dichalcogenide bond reduces the voltage of the reaction. The most popular transition metal dichalcogenides have a common crystal structure and form a group of layered, highly anisotropic compounds.

In contrast to the intercalation process, the conversion process enables full utilization of all the redox potentials of the host metal as it reduces fully to the metallic state. In the specific case of metal fluorides, this transition behaves quasi-ion-like with redox potentials approaching that of free ions in solution due to the fact that metal fluoride compounds are highly ionic. The metal fluoride conversion reaction leads to LiF and metal (Me) products which are on the scale of 2-5 nm. Reversibility and thus reformation of the $MeF_x$ structure can occur on the following charge due to the extremely small diffusion distances between these thermodynamically very stable reaction products. The practical result is the theoretical improvement of the specific capacity of the positive electrode from 274 mAh/g for layered intercalation compounds to >700 mAh/g for the reversible conversion metal trifluorides. This may be represented according to formula [1]:

$$xLi^+ + xe^- + MeF_x \leftrightarrow xLiF + Me \quad [1]$$

The physical proof of the ability of fluorides to reversibly convert has been demonstrated by the separate but parallel efforts of Hong (Li, H., et al. *Adv. Mater.* 15:736-739. 2003) and Badway (Badway, F., et al. *J Electrochem. Soc.* 150(10): A1318-A1327. 2003; Badway, F., et al. *J Electrochem. Soc.* 150(9):A1209-A1218. 2003). Hong's work involved the use of a $TiF_3$ compound. Reversible conversion was confirmed through the use of Raman spectroscopy which suggested the reformation of $TiF_3$ while the electrochemical data showed multiple cycle reversibility. Badway's approach focused on higher voltage metal fluorides which typically are more insulating. $FeF_3$, $FeF_2$, $NiF_2$ and $CoF_2$ nanocomposites were fabricated with conductive carbon matrices in order to enable their electrochemical properties. These nanocomposites were of relatively low surface area with nanocrystalline regions of $MeF_x$ (10-30 nm) encapsulated by an amorphous carbon matrix. Specific capacities in excess of 600 mAh/g and 400 mAh/g were demonstrated at 70° C. for $FeF_3$ and $NiF_2$, respectively. This approach has lead to the realization of the theoretical voltage of a wide variety of compounds including $FeF_3$, $FeF_2$, $NiF_2$, $CoF_2$, as well as $CrF_3$, $CrF_2$ and $BiF_3$.

The utilization of nanocomposites realizes near theoretical specific capacity with theoretical volumetric energy densities approaching that of $CF_x$. The exceptional rate capability of these materials and their reversibility has been shown to occur through the use of in-situ X-ray diffraction (XRD) and X-ray absorption spectroscopy (XAS). Reversibility was further shown by prefabricating 3LiF+Fe nanocomposites and cycling, thereby liberating lithium during the first charge to be utilized in a Li-ion configuration.

Many of the $MeF_3$ structures are related to $PdF_3$—$ReO_3$ structures based on a primitive cubic cell unit that consists of corner shared $MeF_6$ octahedrons and empty "A" sites. There is little to prevent shearing of these crystal structures hence there is a large range of crystallographic distortions upon moving from the $ReO_3$ structure to the $PdF_3$ structure. These structures form vacant octahedral interstices that allow the diffusion of lithium ions. Cation vacancies allow many $MeF_3$ materials to support intercalation and thereby form $Li_xMeF_3$ compounds such as $TiF_3$, $FeF_3$, and $VF_3$ (Arai, H., et al., *J Power Sources.* 68:716. 1997). It has been demonstrated in other works that the $MeF_3$ compounds supported a 1$e^-$ intercalation region followed by the 2$e^-$ conversion reaction resulting in the following reaction [2]:

$$Li^+ + e^- + MeF_3 \leftrightarrow LiMeF_3$$

$$2Li^+ + 2e^- + LiMeF_3 \leftrightarrow 3LiF + Me \quad [2]$$

In the case of $FeF_3$ nanocomposites, the intercalation mechanism was found to be quite fast and very reversible.

Studies have reported the synthesis of metal fluoride nanocomposite electrode materials utilizing a novel mechanochemical induced reaction. High energy milling of the insulating $CF_1$ and $MeF_2$ compounds resulted in a solid state redox reaction with the oxidation of the $MeF_2$ compound into $MeF_3$. This reaction was induced by the oxidation of the $MeF_2$ compound to $MeF_3$ by the oxidizing power of HT (high temperature fabricated) $CF_1$. The resulting product was a fine nanocomposite of $MeF_3$ in a matrix of conducting carbon that may be represented according to the following reaction [3]:

$$CF_1 + MeF_2 \rightarrow C + MeF_3 \quad [3]$$

The mechanochemical induced oxidation reaction was successfully carried out for the reaction $CrF_2 \rightarrow CrF_3$ and $FeF_2 \rightarrow FeF_3$. Such materials exhibited good reversibility and excellent capacities in excess of 600 mAh/g and 500 mAh/g, respectively. This technique worked for all metal fluorides with $Me^{2+} \rightarrow Me^{3+}$ redox levels below that of the theoretical oxidizing power of $CF_1$.

Previous methodologies for the fabrication of iron fluoride nanocomposites with the highest specific energy density consisted of the high energy milling of various iron fluoride components with a conductive matrix, such as carbon. Although such nanocomposites have imparted marked improvements in energy density relative to existing materials, significant improvement in the rate capability (power density) of the material is needed. Additionally, improvement in the cycling efficiency of the material such that the material can be discharged and charged repeatedly with very little cycle to cycle capacity fade also is needed.

One novel approach is the use of oxyfluoride materials of iron as the active electrode materials. Although such materials have been isolated before, none have been examined as possible electrode materials for lithium batteries. Although Brink et al. (F. J. Brink, R. L. Whiters and J. G. Thompson, J. Solid State Chem., 155, 359-365. 2000) previously reported the solid state synthesis of $FeO_xF_{2-x}$ solid-solutions utilizing $FeF_2$ and $FeOF$ precursors, a significant disadvantage of this fabrication technique is that it requires the preliminary synthesis of $FeOF$, which cannot be formed below 925° C. Moreover, synthesis of the $FeO_xF_{2-x}$ solid-solutions was performed under controlled atmosphere and very high temperatures (850° C. for 3 hours) that resulted in the formation of macro crystalline compounds.

The present invention provides herein a new positive electrode material for electrochemical energy storage and a solution fabrication process for the synthesis of nanostructured iron (oxy)fluoride materials from iron metal and fluorosilicic acid ($H_2SiF_6$) aqueous solutions. The solution synthesis rationale comprises the fabrication at low temperature of nanostructured iron (oxy)fluoride materials $FeO_xF_{2-y}$, with compositions ranging over the entire range from $FeF_2$ to $FeOF$, utilizing inexpensive, commercially available precursors. The formation of a $FeSiF_6$ hydrate intermediate and its subsequent anneal in air are steps critical for the formation of the (oxy)fluoride materials.

SUMMARY

According to one aspect, the present invention provides a composition for use as a positive electrode material for an electrochemical energy storage cell comprising an iron oxyfluoride composite. According to one embodiment, the iron oxyfluoride composite comprises an iron oxyfluoride compound of the formula $FeO_xF_{2-y}$, where $0<y\leq1$ and where $0<x\leq1$. According to another embodiment, the iron oxyfluoride compound further comprises at least one additional metal. According to another embodiment, the at least one additional metal is selected from the group consisting of Li, Mn, Ni, Co, Cu, Ti, V, Cr, Ag, Bi, Sn, Sb, Pb, Mo, and Nb. According to another embodiment, the iron oxyfluoride compound is an iron oxyfluoride nanocrystallite. According to another embodiment, the iron oxyfluoride nanocrystallite has a primary domain size from about 1 nm to about 100 nm. According to another embodiment, x=y. According to another embodiment. According to another embodiment, the iron oxyfluoride composite further comprises an ionic and/or electronic-conductive matrix. According to another embodiment, the conductive matrix is carbon. According to another embodiment, the conductive matrix is a mixed conductor. According to another embodiment, the conductive matrix is a metal oxide. According to another embodiment, the conductive matrix is a metal sulfide. According to another embodiment, the conductive matrix is a metal sulfate. According to another embodiment, the conductive matrix is an inorganic phosphate. According to another embodiment, the conductive matrix is iron phosphate. According to another embodiment, the conductive matrix is iron fluorophosphate. According to another embodiment, the conductive matrix is lithium iron phosphate. According to another embodiment, the conductive matrix is lithium iron fluorophosphate. According to another embodiment, the conductive matrix is a metal nitride. According to another embodiment, the conductive matrix is a metal phosphide. According to another embodiment, the iron oxyfluoride compound is of tetragonal rutile structure and has a "c" lattice parameter less than 3.30 Å.

According to another aspect, the present invention provides a method of fabricating a metallolyte composite, the method comprising steps: (a) providing a starting solution comprising a Me species and fluorosilicic acid; (b) reacting the starting solution to form a $MeSiF_6$ aqueous solution; (c) drying the $MeSiF_6$ aqueous solution at a temperature to a powder form comprising a $MeSiF_6$ hydrate; (d) heat treating the powder form in an atmosphere, thereby fabricating a metallolyte composite; wherein Me is a metal. According to one embodiment, the metallolyte composite fabricated is a metal oxyfluoride. According to another embodiment, the metal composite fabricated is an iron oxyfluoride compound. According to another embodiment, the metallolyte composite fabricated is a metal fluoride. According to another embodiment, the metallolyte composite fabricated is an iron fluoride compound. According to another embodiment, Me is selected from the group consisting of Li, Ag, Fe, Bi, Sn, Sb, Pb, Mo, Nb, Ti, V, Cr, Mn, Co, Ni, and Cu. According to another embodiment, $MeSiF_6$ is $FeSiF_6$. According to another embodiment, the step (b) reaction occurs at a temperature of about 40° C. to about 45° C. According to another embodiment, the step (b) reaction occurs within about 12 hours to about 24 hours. According to another embodiment, step (c) takes place in air at a temperature of about 110° C. According to another embodiment, step (c) takes place in air for about 2 hours to about 3 hours at about 200° C., followed by further heating at a temperature of about 110° C. According to another embodiment, step (d) takes place at a temperature of about 150° C. to about 300° C. According to another embodiment, step (d) takes place in an atmosphere of argon. According to another embodiment, step (d) takes place in an atmosphere of air. According to another embodiment, an inorganic phosphate is added to the $MeSiF_6$ aqueous solution at the end of step (b), thereby fabricating a metallolyte composite comprising a metal fluoride or oxyfluoride component and a phosphate based component, wherein Me is a metal. According to another embodiment, an inorganic phosphate is added to the $MeSiF_6$ hydrate powder form at the end of step (c), thereby fabricating a metallolyte composite comprising a metal fluoride or oxyfluoride component and a phosphate based component, wherein Me is a metal. According to another embodiment, the inorganic phosphate component added comprises from about 1% inorganic phosphate component to about 50% inorganic phosphate component. According to another embodiment, the fabricated metallolyte composite is of a tetragonal rutile structure and has a "c" lattice parameter less than 3.30 Å. According to another embodiment, the fabricated metallolyte composite is a nanoparticle. According to another embodiment, Me is Fe. According to another embodiment, the iron oxyfluoride compound is of formula $FeOxF_{2-y}$ where $0<y\leq1$ and where $0<x\leq1$, preferably where for x=y. According to another embodiment, the iron oxyfluoride compound further comprises at least one additional metal.

According to another embodiment, the at least one additional metal is selected from the group consisting of Li, Mn, Ni, Co, Cu, Ti, V, Cr, Ag, Bi, Sn, Sb, Pb, Mo, and Nb combined in a stoichiometric proportion. According to another embodiment, the iron oxyfluoride compound is an iron oxyfluoride nanocrystallite. According to another embodiment, the iron oxyfluoride nanocrystallite has a primary domain size from about 1 nm to about 100 nm. According to another embodiment, the metallolyte composite further comprises a conductive matrix. According to another embodiment, the conductive matrix is carbon. According to another embodiment, the conductive matrix is a mixed conductor. According to another embodiment, the conductive matrix is a metal oxide. According to another embodiment, the conductive matrix is a metal sulfide. According to another embodiment, the conductive matrix is a metal sulfide. According to another embodiment, the conductive matrix is an inorganic phosphate. According to another embodiment, the conductive matrix is a metal nitride. According to another embodiment, the conductive matrix is iron phosphate. According to another embodiment, the conductive matrix is iron fluorophosphate. According to another embodiment, the conductive matrix is lithium iron phosphate. According to another embodiment, the conductive matrix is lithium iron fluorophosphate.

According to another aspect, the present invention provides an electrochemical cell comprising a negative electrode, a positive electrode comprising an iron oxyfluoride composite, and a separator disposed between the negative and positive electrodes. According to one embodiment, the iron oxyfluoride composite comprises an iron oxyfluoride compound of the formula $FeO_xF_{2-y}$, where $0<y\leq1$ and $0<x\leq1$. According to another embodiment, the iron oxyfluoride compound further comprises at least one additional metal. According to another embodiment, the at least one additional metal is selected from the group consisting of Li, Mn, Ni, Co, Cu, Ti, V, Cr, Ag, Bi, Sn, Sb, Pb, Mo, and Nb. According to another embodiment, the iron oxyfluoride compound is an iron oxyfluoride nanocrystallite. According to another embodiment, the iron oxyfluoride nanocrystallite has a primary domain size from about 1 nm to about 100 nm. According to another embodiment, $x=y$. According to another embodiment, the iron oxyfluoride composite further comprises a conductive matrix. According to another embodiment, the conductive matrix is carbon. According to another embodiment, the conductive matrix is a mixed conductor. According to another embodiment, the conductive matrix is a metal oxide. According to another embodiment, the conductive matrix is a metal sulfide. According to another embodiment, the conductive matrix is a metal sulfide. According to another embodiment, the conductive matrix is an inorganic phosphate. According to another embodiment, the conductive matrix is iron phosphate. According to another embodiment, the conductive matrix is lithium iron phosphate. According to another embodiment, the conductive matrix is lithium fluorophosphate. According to another embodiment, the conductive matrix is a metal nitride or phosphide. According to another embodiment, the conductive matrix is a metal phosphide. According to another embodiment, the iron oxyfluoride compound is of tetragonal rutile structure and has a "c" lattice parameter less than 3.30 Å.

BRIEF DESCRIPTION OF THE DRAWINGS

FIG. 29 shows the discharge specific capacity (mAh/g) of an iron oxyfluoride nanocomposite plotted as a function of cycle number. The VC additive (1 wt % and 2 wt %) improved cycle life.

FIG. 30 shows an illustrative XRD pattern of materials obtained from the solution fabrication process. The rhombohedral R-3m $FeSiF_6.6H_2O$ compound completely transforms into tetragonal $FeF_2$ and $FeO_xF_y$ compounds obtained after a 4-hour heat-treatment at 200° C. in argon and in air, respectively.

DETAILED DESCRIPTION

Iron Oxyfluoride Compositions

Figure 1:
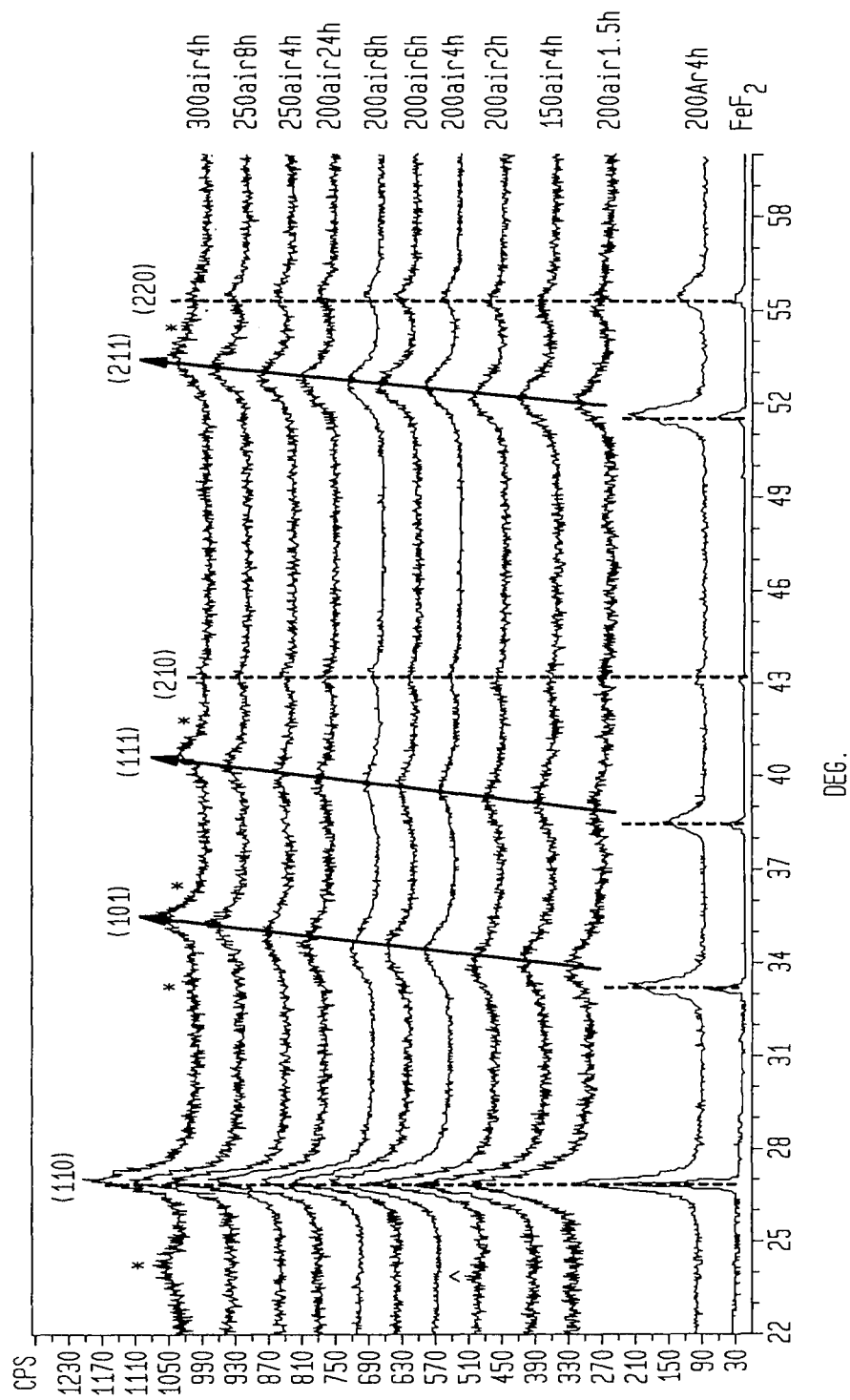
FIG. 1 shows XRD data illustrating the effect of annealing temperature, time and atmosphere on the iron (oxy)fluoride compositions of the present invention. The XRD spectra of a commercial $FeF_2$ was added for comparison.

The present invention provides a composition for use as an electrode material for an electrochemical energy storage cell comprising an iron oxyfluoride composite and a method of fabrication thereof.

According to one aspect, the present invention provides a composition for use as an electrode material for an electrochemical energy storage cell comprising an iron oxyfluoride composite.

According to another embodiment, the iron oxyfluoride composite comprises an iron oxyfluoride compound of the formula $FeO_xF_{2-y}$ where $0<x\leq 1$ and $0<y\leq 1$. According to some such embodiments, $x=y$. According to some such embodiments, x spans the entire x range from pure $FeF_2$ to pure FeOF.

The term "element" as used herein refers to simple substances which cannot be resolved into simpler substances by normal chemical means.

As used herein, the term "iron oxyfluoride compound" includes any combination that comprises the elements of iron (Fe), fluoride (F), oxygen (O), and, optionally, at least one additional metal (Me). An iron oxyfluoride compound may be incorporated within a primary particle, which may or may not be of nanoparticle size.

According to some embodiments, the iron oxyfluoride compound of the invention further comprises at least one additional metal, meaning a metal other than Fe. One of skill in the art may readily identify metals for use in an iron oxyfluoride compound of the present invention. Such metals include, but are not limited to, Li, Mn, Ni, Co, Cu, Ti, V, Cr, Ag, Bi, Sn, Sb, Pb, Mo, and Nb.

The term "domain size" as used herein refers to the length of the primary material before it contacts a boundary of a second material. The second material may include, but is not limited to, a particle, a crystallite, a crystallite of iron oxyfluoride, or other such material. The term "particle" as used herein refers to any discrete unit of material structure. The size ranges of particles may be summarized as follows: (1) subatomic: protons, neutrons, electrons, deuterons, etc. These are collectively called fundamental particles; (2) molecular: includes atoms and molecules with size ranging from a few angstroms to half a micron; (3) colloidal: includes macromolecules, micelles, and ultrafine particles such as carbon black, resolved via electron microscope, with size ranges from 1 millimicron up to lower limit of the optical microscope (1 micron); (4) microscopic: units that can be resolved by an optical microscope (includes bacteria); and (5) macroscopic: all particles that can be resolved by the naked eye. The term "macrostructure" as used herein refers to materials of macroscopic size. The term "particle size" as used herein generally refers to the solid particles of which industrial materials are composed. The smaller the particle, the greater will be the total exposed surface area of a given mass. Activity is a direct function of surface area; i.e., the finer a substance is, the more efficiently it will react, both chemically and physically.

The term "crystal" refers to a homogenous solid formed by a repeating, three-dimensional pattern of atoms, or ions and having fixed distances between constituent parts or the unit cell of such a pattern. The terms "crystal structure" or "crystal lattice" are used interchangeably herein to refer to the arrangement or formation of atoms or ions within the crystal. The term "crystallite" as used herein refers to that portion of a crystal whose constituent atoms, ions or molecules form a perfect lattice, without strains or other imperfections. Single crystals may be quite larger, but crystallites are usually microscopic and may be considered domains.

The terms "nanocrystallite" and "nanoparticle" are used interchangeably and refer to crystallites of about 100 nm to about 1 nm in size. As is well known in the art, crystallite size may be determined by common methodologies such as peak breadth analysis in X-ray diffraction (XRD) and high resolution transmission electron diffraction. The term "nanocrystallite" as used herein refers to a discrete crystallite <100 nm in size or a crystallite <100 nm in size incorporated into a matrix resulting in the formation of a nanocomposite. The final nanocomposite may or may not be of sizes greater than 100 nm.

According to another embodiment, the iron oxyfluoride composite is an iron oxyfluoride nanocomposite.

The term "rutile" as used herein refers to a structure similar to that of titanium dioxide. The rutile structure crystallizes in the tetragonal $P4_2/mnm$ system symmetry (a- and c-lattice parameters in the (100) and (001) directions respectively) with edge-sharing $AX_6$ octahedra along the c-axis while sharing corners in the ab plane. According to another embodiment, the iron oxyfluoride composite comprises an iron oxyfluoride compound demonstrating tetragonal rutile structure. According to another embodiment, the iron oxyfluoride composite comprises an iron oxyfluoride compound demonstrating a "c" lattice parameter <3.30 Å. According to some such embodiments, the iron oxyfluoride composite further comprises an iron oxyfluoride compound with a surface layer of iron oxide. According to some such embodiments, the surface layer is a thin surface layer of about 1 nm to about 10 nm. According to some such embodiments, the iron oxyfluoride composite further comprises an iron oxyfluoride compound with a surface layer of iron oxyfluoride of higher oxygen content that the core material. According to some such embodiments, the surface layer is a thin surface layer of about 1 nm to about 10 nm.

According to some embodiments, the specific capacity of the iron oxyfluoride compound is reversible. The term "specific capacity" as used herein refers to the amount of energy the iron oxyfluoride compound contains in milliamp hours (mAh) per unit weight. As used herein, the term "reversible specific capacity" means that the iron oxyfluoride compound of the present invention may be recharged by passing a current through it in a direction opposite to that of discharge.

The term "composite" as used herein refers to a compound comprising at least one or more distinct components, constituents, or elements. These components, constituents, or elements may include, but are not limited to, metal fluorides, metal oxyfluorides, conductive matrices, carbon, metal oxides, metal sulfides, inorganic phosphates, metal nitrides, metal phosphides, lithium phosphate, iron phosphate, lithium iron phosphate, lithium iron fluorophosphates, $Li_3PO_4$, $LiH_2PO_4$, Li, Mn, Ni, Co, Cu, Ti, V, Cr, Ag, Bi, Sn, Sb, Pb, Mo, Nb, and Fe, or combinations thereof. Components of the composite may be in the form of, but not limited to, particles, crystallites, powders, solutions, solids, nanocrystallites, or nanoparticles.

According to another embodiment, the present invention provides an iron oxyfluoride composite comprising an iron oxyfluoride compound that has a primary domain size of about 1 nm to about 100 nm in diameter. According to some such embodiments, the primary domain size is about 1 nm to about 90 nm in diameter. According to some such embodiments, the primary domain size is about 1 nm to about 80 nm in diameter. According to some such embodiments, the primary domain size is about 1 nm to about 70 nm in diameter.

According to such some embodiments, the primary domain size is about 1 nm to about 60 nm in diameter. According to some such embodiments, the primary domain size is about 1 nm to about 50 nm in diameter. According to such some embodiments, the primary domain size is about 1 nm to about 40 nm in diameter. According to some such embodiments, the primary domain size is about 1 nm to about 30 nm in diameter. According to some such embodiments, the primary domain size is about 1 nm to about 20 nm in diameter. According to some such embodiments, the primary domain size is about 1 nm to about 15 nm in diameter. According to some such embodiments, the primary domain size is about 1 nm to about 10 nm in diameter. According to some such embodiments, the primary domain size is about 1 nm to about 5 nm in diameter.

According to some such embodiments, the iron fluoride compound is in the form of a particle. According to some such embodiments, the iron fluoride compound is in the form of a nanoparticle. According to some such embodiments, the iron fluoride compound is in the form of a crystal. According to some such embodiments, the iron fluoride compound is in the form of a nanocrystal.

According to another embodiment, the iron oxyfluoride composite further comprises a conductive matrix. The term "conductive matrix" as used herein refers to a matrix that includes conductive materials, some of which may be ionic and/or electronic conductors. According to another embodiment, the conductive matrix is a mixed conductor. Materials in which the matrix retains both ionic and electronic conductivity commonly are referred to as "mixed conductors." Iron oxyfluoride-based mixed conductors for high energy density cathode materials may be utilized to stabilize the iron oxyfluoride compound in a matrix or framework of the mixed conductors and enable the electrochemical activity of the iron oxyfluoride compound. Various conductive matrices may be utilized in order to allow transport of electrons and/or ions to the iron oxyfluoride compound, which may or may not be in the form of particles. Suitable conductive matrices include, but are not limited to, carbon, metal oxides, metal sulfides, inorganic phosphates, metal phosphides, and metal nitrides.

According to some embodiments, the iron oxyfluoride composite comprises about 1 to about 50 weight % of a conductive matrix. According to some embodiments, the iron oxyfluoride composite comprises about 1 to about 45 weight % of a conductive matrix. According to some embodiments, the iron oxyfluoride composite comprises about 1 to about 40 weight % of a conductive matrix. According to some embodiments, the iron oxyfluoride composite comprises about 1 to about 35 weight % of a conductive matrix. According to some embodiments, the iron oxyfluoride composite comprises about 1 to about 30 weight % of a conductive matrix. According to some embodiments, the iron oxyfluoride composite comprises about 1 to about 25 weight % of a conductive matrix. According to some embodiments, the iron oxyfluoride composite comprises about 1 to about 20 weight % of a conductive matrix. According to some embodiments, the iron oxyfluoride composite comprises from about 1 to about 15 weight % of a conductive matrix. According to some embodiments, the iron oxyfluoride composite comprises about 1 to about 10 weight % of a conductive matrix. According to some embodiments, the iron oxyfluoride composite comprises about 1 to about 5 weight % of a conductive matrix.

According to another embodiment, the iron oxyfluoride composite further comprises carbon. According to some such embodiments, the carbon is an activated carbon. The term "activated carbon" as used herein refers to a form of carbon processed to make it extremely porous and to thus have a very large surface area available. A gram of activated carbon may have a surface area from about 500 $m^2$ to about 2000 $m^2$. According to some such embodiments, the activated carbon is ASupra® (Norit). According to another embodiment, the iron oxyfluoride composite further comprises a metal oxide. According to some such embodiments, the metal of the metal oxide is V. According to some such embodiments, the metal of the metal oxide is Mo.

According to another embodiment, the iron oxyfluoride composite further comprises a lithium, iron or lithium iron phosphate or fluorophosphate. According to some such embodiments, the lithium phosphate is of the general formula $Li_\alpha H_{3-\alpha}PO_4$ where $0<\alpha\leq3$. According to some such embodiments, the lithium phophates is $Li_3PO_4$. According to some such embodiments, the lithium phosphate is $LiH_2PO_4$. According to some such embodiments, the iron phosphate is $FePO_4$. According to some such embodiments, the iron phosphate is $FeFPO_4$. According to some such embodiments, the lithium iron phosphate is $LiFePO_4$. According to some such embodiments, the lithium iron phosphate is $Li_3Fe_2(PO_4)_3$. According to some such embodiments, the lithium iron fluorophosphate is $LiFePO_4F$.

Solution Fabrication Process

Generally, as used herein, the term "solution fabrication process" refers to techniques for the synthesis of nanostructured iron (oxy)fluoride materials from iron metal and fluorosilicic acid ($H_2SiF_6$) aqueous solutions. The solution synthesis rationale comprises the fabrication at low temperature of nanostructured iron (oxy)fluoride materials $FeO_xF_y$, with compositions ranging over the entire range from $FeF_2$ to FeOF, utilizing inexpensive commercially available precursors. The formation of the $FeSiF_6$ hydrate intermediate and its subsequent anneal in air are critical steps for the formation of the (oxy)fluoride materials.

The term "fluorosilicic acid" refers to $H_2SiF_6$.

The term "metallolyte composite" as used herein refers to a material, compound, substance or product that results from a chemical reaction that includes a metal (Me) element. A metallolyte composite comprises at least one of a metal oxyfluoride, a metal fluoride, or derivative thereof, and also may include additional components, such as but not limited to, conductive matrices, carbon, metal oxides, metal sulfides, inorganic phosphates, metal fluorophosphates, metal phosphides, and metal nitrides, lithium phosphate, $Li_3PO_4$, $LiH_2PO_4$, Li, Mn, Ni, Co, Cu, Ti, V, Cr, Ag, Bi, Sn, Sb, Pb, Mo, Nb, and Fe, iron fluoride, iron oxyfluoride, iron oxyfluoride composites, iron oxyfluoride compounds, iron fluoride composites, iron fluoride compounds, or combinations thereof.

According to one aspect, the present invention provides a method of fabricating a metallolyte composite, the method comprising steps: (a) providing a starting solution comprising a Me species and fluorosilicic acid; (b) reacting the starting solution to form a $MeSiF_6$ solution; (c) drying the $MeSiF_6$ solution at a temperature to a powder form; (d) further heat treating the resulting powder in an atmosphere, such that a metallolyte composite is fabricated; wherein Me is a metal. According to one embodiment, the metallolyte composite fabricated is a metal oxyfluoride. According to another embodiment, the metallolyte composite fabricated is a metal fluoride.

According to one embodiment, the Me species is Fe. According to another embodiment, the metal species is a first row transition metal. Such metals include Ti, V, Cr, Mn, Fe, Co, Ni, and Cu.

According to another embodiment, the Me species is Bi. According to another embodiment, the Me species is Sn. According to another embodiment, the Me species is Sb. According to another embodiment, the Me species is Pb. According to another embodiment, the Me species is Mo. According to another embodiment, the Me species is Nb. According to another embodiment, the Me species is Li. According to another embodiment, the Me species is Ag.

According to another embodiment, $MeSiF_6$ hydrate is $FeSiF_6$ hydrate. According to another embodiment, $FeSiF_6$ hydrate is $FeSiF_6 \cdot 6H_2O$.

According to another embodiment, the step (b) reaction of forming a $MeSiF_6$ solution from the starting solution occurs at a temperature of about 40° C. to about 45° C. In some such embodiments, the reaction of forming a $MeSiF_6$ solution from the starting solution occurs overnight. In some such embodiments, the reaction of forming a $MeSiF_6$ solution from the starting solution occurs within 12-24 hours from the start of the reaction.

According to another embodiment, the drying step (c) occurs in air at about 110° C. According to some such embodiments, the drying step (c) comprises (i) drying the $MeSiF_6$ aqueous solution for about 2-3 hours at about 200° C. on a stirring hotplate, and (ii) further drying the solution in air at about 110° C. According to some such embodiments, the drying step (c) occurs on a hot plate.

According to another embodiment, heat treating step (d) occurs at temperatures from about 150° C. to about 300° C.

According to another embodiment, heat treating step (d) occurs in an atmosphere of Argon. According to some such embodiments, the metallolyte composite fabricated is a metal fluoride. According to some such embodiments, the metallolyte composite fabricated is a plurality of metal fluorides.

The term "atmosphere" as used herein refers to any gaseous envelope or medium.

According to another embodiment, the heat treating step (d) occurs in an atmosphere of air. As used herein, the term "air" refers to the Earth's atmosphere (or air) and refers to a layer of gases surrounding the planet Earth that is retained by the Earth's gravity. Dry air contains roughly (by volume) 78.08% nitrogen, 20.95% oxygen, 0.93% argon, 0.038% carbon dioxide, and trace amounts of other gases. Air also contains a variable amount of water vapor, on average around 1%. According to some such embodiments, the metallolyte composite formed is a metal oxyfluoride. According to some such embodiments, the metallolyte composite formed is a plurality of metal oxyfluorides.

According to some such embodiments, the oxygen content of the metal oxyfluoride is correlated to the annealing temperature and duration of heating of step (d).

According to another embodiment, the metallolyte composite may be fabricated by extreme, high impact-energy milling of a mixture that includes iron and the other components. As a non-limiting example, when iron (oxy)fluoride compound is milled with another component, the iron (oxy)fluoride undergoes chemical changes such that its X-ray diffraction (XRD) characteristics take on the character of a new, highly electrochemically active material, although retaining major electrochemical aspects of the iron (oxy)fluoride. Iron (oxy)fluoride may be characterized easily by well known methods, such as XRD and high resolution transmission electron diffraction.

According to another embodiment, the metallolyte composite fabricated comprises an iron fluoride composite. According to another embodiment, the metallolyte composite fabricated comprises an iron fluoride compound.

According to another embodiment, the metallolyte composite fabricated comprises an iron oxyfluoride composite. According to another embodiment, the metallolyte composite comprises an iron oxyfluoride compound. According to some such embodiments, the iron oxyfluoride compound is of formula $FeO_xF_{2-y}$, where $0<y\le1$ and where $0<x\le1$. According to some such embodiments, x=y. According to some such embodiments, the iron oxyfluoride compound further comprises at least one additional metal. Such metals may include, but are not limited to, Li, Mn, Ni, Co, Cu, Ti, V, Cr, Ag, Bi, Sn, Sb, Pb, Mo, and Nb. According to some such embodiments, the iron oxyfluoride compound is an iron oxyfluoride nanocrystallite. According to some such embodiments, the primary domain of the iron oxyfluoride nanocrystallite is from about 1 nm to about 100 nm in length. According to some such embodiments, the primary domain of the iron oxyfluoride nanocrystallite is from about 1 nm to about 20 nm in length.

According to another embodiment, the metallolyte composite comprises a conductive matrix. According to some such embodiments, the conductive matrix is carbon. According to some such embodiments, the conductive matrix is a mixed conductor. According to some such embodiments, the conductive matrix is a metal oxide. According to some such embodiments, the conductive matrix is a metal sulfide. According to some such embodiments, the conductive matrix is a inorganic phosphate. According to some such embodiments, the conductive matrix is a metal nitride or phosphide.

According to another embodiment, the iron oxyfluoride composite further comprises a lithium, iron or lithium iron phosphate or fluorophosphate. According to some such embodiments, the lithium phosphate is of the general formula $Li_\alpha H_{3-\alpha}PO_4$ where $0<\alpha\le3$. According to some such embodiments, the lithium phosphate is $Li_3PO_4$. According to some such embodiments, the lithium phosphate is $LiH_2PO_4$. According to some such embodiments the iron phosphate is $FePO_4$. According to some such embodiments, the iron phosphate is $FeFPO_4$. According to some such embodiments, the lithium iron phosphate is $LiFePO_4$. According to some such embodiments, the lithium iron phosphate is $Li_3Fe_2(PO4)_3$. According to some such embodiments, the lithium iron fluorophosphate is $LiFePO_4F$.

According to another embodiment, the amount of inorganic phosphate added is 5 wt % inorganic phosphate. According to another embodiment, the amount of inorganic phosphate added is 10 wt % inorganic phosphate. According to another embodiment, the amount of inorganic phosphate added is 15 wt % inorganic phosphate. According to another embodiment, the amount of inorganic phosphate added is 20 wt % inorganic phosphate. According to another embodiment, the amount of inorganic phosphate added is 25 wt % inorganic phosphate. According to another embodiment, the amount of inorganic phosphate added is 30 wt % inorganic phosphate. According to another embodiment, the amount of inorganic phosphate added is 35 wt % inorganic phosphate. According to another embodiment, the amount of inorganic phosphate added is 40 wt % inorganic phosphate. According to another embodiment, the amount of inorganic phosphate added is 45 wt % inorganic phosphate. According to another embodiment, the amount of inorganic phosphate added is 50 wt % inorganic phosphate.

According to another embodiment, the metallolyte composite fabricated is of tetragonal rutile structure and has a "c" lattice parameter less than 3.30 Å. According to another embodiment, the metallolyte composite fabricated is a nanoparticle.

According to another embodiment, the metallolyte composite formed is an iron (oxy)fluoride compound nanoparticle. According to another embodiment, the metallolyte composite formed is a nanostructured iron (oxy)fluoride compound. According to another embodiment, metallolyte composite formed is an iron (oxy)fluoride-based compound that is conductive.

According to another embodiment, the metallolyte composite formed is an iron oxyfluoride compound that demonstrates a conversion reaction. As used herein, the term "conversion reaction" refers to reactions in which an iron oxyfluoride compound is fully reduced during battery cell discharge to a mixture of iron metal $Fe^0$, lithium fluoride LiF and a $Li_yFe_{1-z/2}O_xF_{2-x-z}$ compound with $y \leq x \leq 1$, $z \leq 2-x$ and where y may equal zero. According to another embodiment, the iron oxyfluoride may be reduced into iron metal with the concomitant formation of magnesium or calcium compound products.

According to another embodiment, the metallolyte composite formed is an iron oxyfluoride compound that demonstrates a reversible conversion reaction. As used herein, the term "reversible conversion reaction" refers to a reaction in which the iron oxyfluoride compound is capable of reforming during a battery cell charge.

Electrochemical Cells

According to another aspect of the present invention, an electrochemical cell, such as, for example, a primary or rechargeable battery cell, is provided, which employs the inventive iron oxyfluoride composite as the cathode material. The cell may be prepared by any known method. The inventive iron oxyfluoride composite electrode (cathode) materials function well with most other known primary or secondary cell composition components, including polymeric matrices and adjunct compounds, as well as with commonly used separator and electrolyte solvents and solutes. For example, electrolyte compositions commonly used in known rechargeable electrochemical-cell fabrication serve equally well in the cells of the present invention. These electrolyte compositions may include one or more metallic salts, such as, but not limited to, lithium, sodium, magnesium, calcium, zinc, manganese, and yttrium. Such metallic salts may be a molten salt solution or salts which offer fast fluoride diffusion. Lithium salts, such as $LiPF_6$, $LiBF_4$, $LiClO_4$, and the like, dissolved in common cyclic and acyclic organic solvents, such as ethylene carbonate, dimethyl carbonate, propylene carbonate, ethyl methyl carbonate, and mixtures thereof, may be used. As with optimization of the iron oxyfluoride composite of the present invention, specific combinations of electrolyte components will be a matter of preference of the cell fabricator and may depend on an intended use of the cell, although consideration may be given to the use of solutes such as $LiBF_4$, which appear less susceptible during cell cycling to hydrolytically forming HF, which could affect the optimum performance of some metal fluorides. For such reason, for instance, a $LiBF_4$: propylene carbonate electrolyte may be utilized over one comprising a long-utilized standard solution of $LiPF_6$ in a mixture of ethylene carbonate:dimethyl carbonate.

In addition, the iron oxyfluoride composites of the present invention may be incorporated into solid state polymer cells utilizing solid state ionically conducting matrices derived from compounds such as polyethylene oxide (PEO). The iron oxyfluoride composite of the present invention also may be fabricated by thin film deposition techniques and may be incorporated into solid state thin film lithium batteries utilizing a glassy electrolyte. Finally, such electrode materials may be incorporated into cells utilizing ionic liquid solvents as the electrolytes.

Likewise, the negative electrode members of electrochemical cells may advantageously include any of the widely used known ion sources such as lithium metal and lithium alloys, such as those comprised of lithium tin, lithium silicon, lithium aluminum, lithiated carbons such as those based on coke, hard carbon, graphite, nanotubes, or $C_{60}$, and lithiated metal nitrides. The negative electrode members of electrochemical cells also may further include either a magnesium-, calcium-, zinc-, manganese-, or yttrium-based negative electrode.

Where a range of values is provided, it is understood that each intervening value, to the tenth of the unit of the lower limit unless the context clearly dictates otherwise, between the upper and lower limit of that range and any other stated or intervening value in that stated range is encompassed within the invention. The upper and lower limits of these smaller ranges which may independently be included in the smaller ranges is also encompassed within the invention, subject to any specifically excluded limit in the stated range. Where the stated range includes one or both of the limits, ranges excluding either both of those included limits are also included in the invention.

Unless defined otherwise, all technical and scientific terms used herein have the same meaning as commonly understood by one of ordinary skill in the art to which this invention belongs. Although any method and materials similar or equivalent to those described herein can also be used in the practice or testing of the present invention, the preferred methods and materials are now described. All publications mentioned herein are incorporated herein by reference to disclose and described the methods and/or materials in connection with which the publications are cited.

It must be noted that as used herein and in the appended claims, the singular forms "a", "and", and "the" include plural references unless the context clearly dictates otherwise. All technical and scientific terms used herein have the same meaning.

The publications discussed herein are provided solely for their disclosure prior to the filing date of the present application. Nothing herein is to be considered as an admission that the present invention is not entitled to antedate such publication by virtue of prior invention. Further, the dates of publication provided may be different from the actual publication dates which may need to be independently confirmed.

While the present invention has been described with reference to the specific embodiments thereof it should be understood by those skilled in the art that various changes may be made and equivalents may be substituted without departing from the true spirit and scope of the invention. In addition, many modifications may be made to adopt a particular situation, material, composition of matter, process, process step or steps, to the objective spirit and scope of the present invention. All such modifications are intended to be within the scope of the claims appended hereto.

EXAMPLES

The following examples are put forth so as to provide those of ordinary skill in the art with a complete disclosure and description of how to make and use the present invention, and are not intended to limit the scope of what the inventors regard as their invention nor are they intended to represent that the experiments below are all or the only experiments performed. Efforts have been made to ensure accuracy with respect to numbers used (e.g. amounts, temperature, etc.) but some experimental errors and deviations should be accounted for. Unless indicated otherwise, parts are parts by weight, molecular weight is weight average molecular weight, temperature is in degrees Centigrade, and pressure is at or near atmospheric. In addition, although the oxyfluoride compositions have been denoted as $FeO_xF_{2-x}$ with $0<x\leq 1$ in all examples, deviations from a one to one oxygen for fluorine substitution may occur and the oxyfluoride compositions may be more accurately denoted as $FeO_xF_{2-y}$, where $0<y\leq 1$ and where $0<x\leq 1$.

Example 1.1

Solution Fabrication Process Methodolgy

Nanostructured iron (oxy)fluoride materials of tunable oxygen content were fabricated through a solution fabrication process from iron metal and fluorosilicic acid ($H_2SiF_6$) aqueous solutions. Briefly, iron metal (10 grams) in powder form was dissolved in 141 grams of a 20-25 wt % fluorosilicic acid in water solution. The mixture was placed at 40-45° C. overnight to allow the reaction of the metal with the fluorosilicic acid. After filtering the excess iron metal, the resulting green solution was placed in air at 110° C. until a dry powder formed. An alternative route consisted in drying the solution for 2-3 hours at 200° C. (e.g., on a stirring hotplate) prior to drying at 110° C. The latter process reduced the processing time considerably. Both routes resulted in the synthesis of a $FeSiF_6$ hydrate compound in the powder form.

FIG. 30 shows an illustrative x-ray diffraction (XRD) pattern for the rhombohedral R-3m $FeSiF_6 \cdot 6H_2O$ compound which completely transforms into tetragonal $P4_2/mnm$ $FeF_2$ and $FeO_xF_{2-x}$, with (110), (101), (111), (210), (211) and (220) diffraction peaks, when subsequently heat treated at 200° C. for 4 hours in argon and air respectively. While both the $FeF_2$ and the $FeO_xF_{2-x}$ compounds crystallize in the rutile-type structure, all the (hk1) diffraction peaks of the oxyfluoride compound were found to be shifted towards larger angles compared to pure fluoride.

Table 1 shows the unit cell volume and lattice parameters of compounds of the present invention. The lattice parameters of the $FeF_2$ obtained by the solution process after heat-treatment with argon agree well with those of a commercial sample (Table 1). In contrast, the materials synthesized in air, which exhibited (hk1) Bragg reflections shifted towards larger angles revealed a decrease of the tetragonal a- and more particularly of the c-lattice parameter (Table 1). The contraction of the rutile-type unit cell of the $FeO_xF_{2-x}$ compound obtained in air compared to $FeF_2$ obtained in argon stems from the oxidation of $Fe^{2+}$ into $Fe^{3+}$, which is smaller in size, concurrent with the direct substitution of $O^{2-}$ into the fluoride anion sublattice. Since both the $O^{2-}$ and $F^-$ anions have similar size, substitution may occur randomly throughout the entire anion sublattice.

TABLE 1

| Sample | Unit Cell Vol. (Å³) | a lattice parameter (Å) | c lattice parameter (Å) |
|---|---|---|---|
| $FeF_2$ (Commercial) | 72.68 | 4.693 ± .001 | 3.301 ± .002 |
| $FeF_2$ (Commercial) + 4 hrs in air at 200° C. | 72.79 | 4.694 ± .001 | 3.304 ± .001 |
| $FeSiF_6 \cdot 6H_2O$ + 4 hrs in Ar at 200° C. | 72.68 | 4.690 ± .002 | 3.303 ± .005 |
| $FeSiF_6 \cdot 6H_2O$ + 4 hrs in Ar at 200° C. + 4 hrs in air at 200° C. | 72.44 | 4.689 ± .003 | 3.295 ± .005 |
| $FeSiF_6 \cdot 6H_2O$ + 4 hrs in Ar at 200° C. + 24 hrs in air at 200° C. | 72.41 | 4.691 ± .001 | 3.291 ± .001 |
| $FeSiF_6 \cdot 6H_2O$ + 4 hrs in air at 200° C. | 68.85 | 4.683 ± .003 | 3.140 ± .005 |
| $FeSiF_6 \cdot 6H_2O$ + 24 hrs in air at 200° C. | 68.35 | 682 ± .003 | 3.118 ± .005 |

Figure 31:
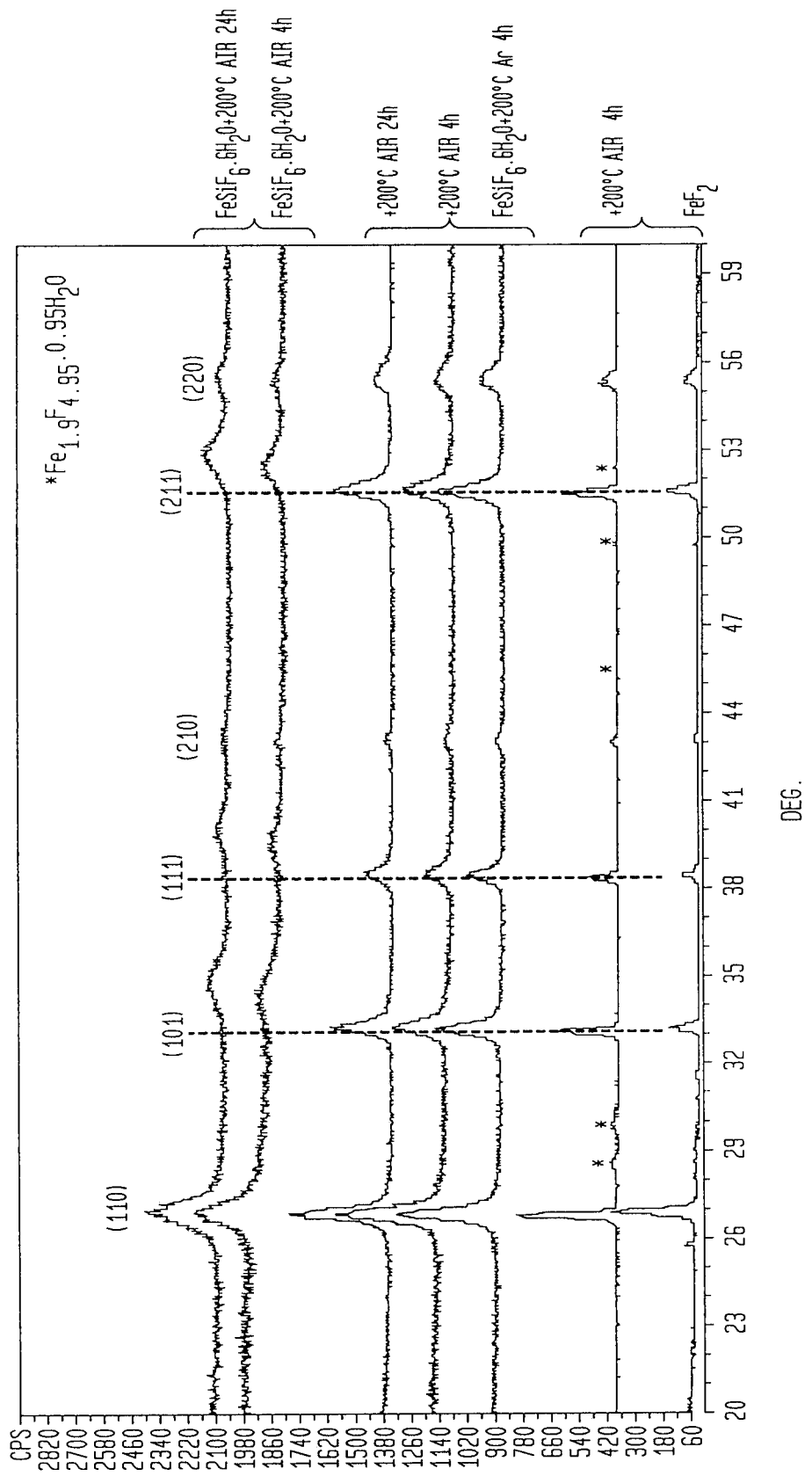
FIG. 31 shows XRD patterns obtained after annealing in air at 200° C. the commercial and solution-based (i.e. obtained by annealing the $FeSiF_6$ hydrate intermediate in argon) $FeF_2$, compared to the compound generated upon direct heat-treatment (in air) of the $FeSiF_6$ hydrate under similar conditions.

FIG. 31 illustrates the importance of the air heat-treatment of the $FeSiF_6$ hydrate in order to obtain iron oxyfluorides of non-negligible oxygen content. FIG. 31 shows the structural patterns obtained after annealing the commercial and solution-based (i.e. obtained by annealing the $FeSiF_6$ hydrate intermediate in argon) $FeF_2$ in air at 200° C., compared to the compound generated upon direct heat-treatment (in air) of $FeSiF_6$ hydrate under similar conditions. Both types of $FeF_2$ samples maintained the initial structural characteristics of $FeF_2$ with little or no variation of the unit cell volume upon annealing in air. Increasing the duration of the heat-treatment to 24 hours did not affect the $FeF_2$ structure significantly. The only change observed in the commercial sample consisted in the generation of small amounts of the $Fe_{1.9}F_{4.95}$ $0.95H_2O$ hydrate. In contrast, the $FeSiF_6 \cdot 6H_2O$ compounds directly annealed in air showed significant volume contraction (Table 1). The latter is brought about by a decrease in c-lattice parameter consistent with the shift of (hk1) diffraction peaks towards larger angles associated to the introduction of significant amounts of oxygen into the fluoride structure.

Example 1.2

Effect of Annealing Temperature, Time and Atmosphere on the Iron (Oxy)Fluoride Composition: X-ray Diffraction The solution fabrication process described herein was utilized to synthesize $FeF_2$ compound. This $FeF_2$ compound was distinct from commercially obtained $FeF_2$. When synthesized under argon (Ar), the synthesized $FeF_2$ compound showed no evidence of any second phase while the $FeF_2$ obtained from the commercial source contained small amounts of a $Fe_2F_5 \cdot 2H_2O$ hydrate. Further, the broader diffraction peaks associated with the compound obtained by the solution fabrication process indicates that crystallite size (22 nm) of the newly fabricated material was one order of magnitude smaller than the commercial source (>100 nm) (FIG. 1). The crystallite size was determined with the Scherrer formula using the (110) diffraction peaks.

Figure 2:
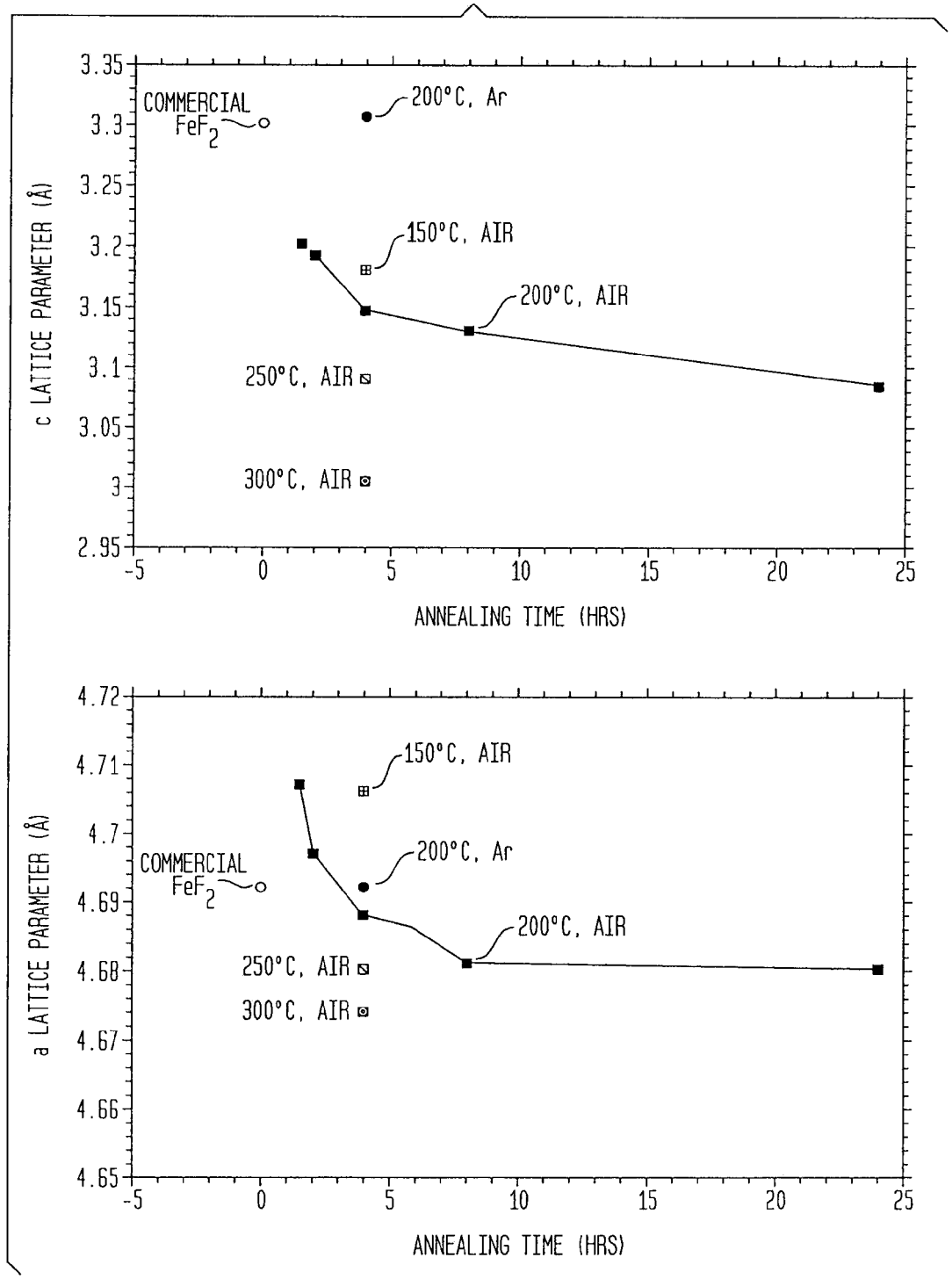
FIG. 2 shows the rutile a- and c-lattice parameters (Å) plotted versus annealing times (hours). The rutile-type structure was maintained as the primary phase at higher temperatures and/or longer annealing time but revealed a systematic increase in the shift of the (hk1) reflections. The (hk1) peak systematic shift translated into a continuous decrease of the c-lattice parameter and of the c/a ratio of the rutile-type structure, as the decrease of the a-lattice parameter remained of much smaller scale.

Upon annealing in air at temperatures as low as 150° C., the $FeSiF_6$ hydrate converts into a rutile-type tetragonal material of $P4_2/mnm$ space group similar to that of $FeF_2$ (obtained upon annealing in Ar) but with all (hid) derived diffraction peaks shifted towards larger angles as shown in FIG. 1. As shown in FIG. 1, the rutile structure was maintained at higher temperatures and/or longer annealing time but revealed a systematic increase in the shift of the (hk1) reflections. This shift could be controlled by adjusting the temperature and time of the heat-treatment in air. As shown in FIG. 2, the (hk1) peak systematic shift translated into a continuous decrease of the c-lattice parameter and more specifically of the c/a ratio of the rutile-type structure, as the decrease of the a-lattice parameter remained of much smaller scale. The c-lattice parameter decreased to 3.21 Å compared to 3.30 Å for pure $FeF_2$ after only 1.5 hours at 200° C. It further decreased to 3.12 Å after annealing in air for 24 hours. Lower c-lattice parameters were obtained with temperatures above 200° C. than those obtained at 200° C. with annealing times of up to 24 hours. For example, after 8 hours at 250° C., the c-lattice parameter decreased to 3.04 Å.

Figure 3:
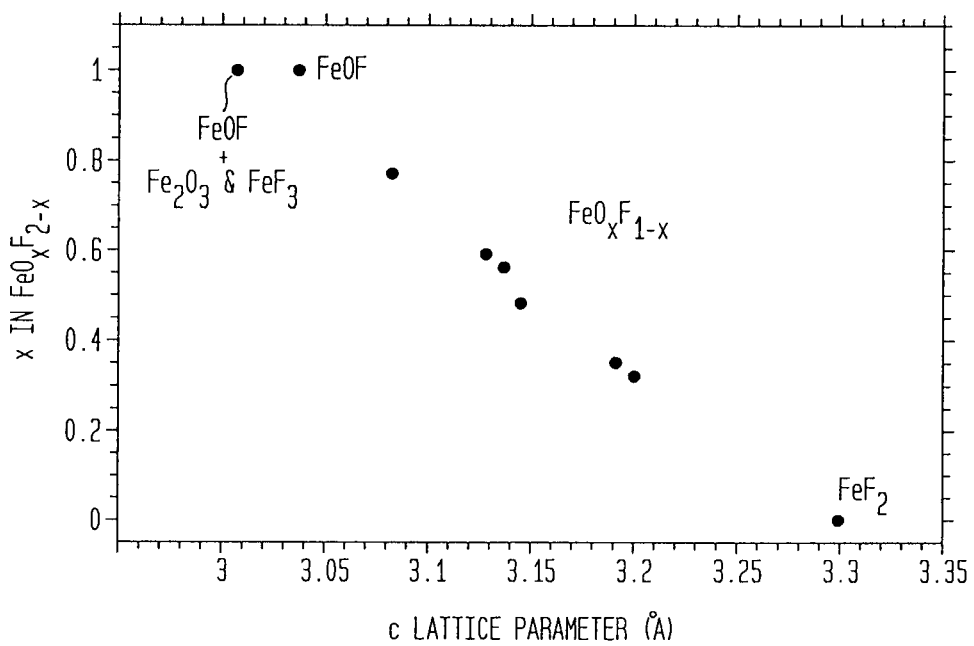
FIG. 3 shows materials oxygen content plotted versus c-lattice parameters. The solution fabrication process allowed the fabrication of $FeO_xF_{2-x}$ compounds where x spans over the entire x range pure $FeF_2$, when annealed in Ar for 4 hours, to pure FeOF, when annealed at 250° C. for 8 hours.

The oxygen content of the iron oxyfluoride materials synthesized by the solution fabrication process were evaluated utilizing the c-lattice parameters obtained by XRD analysis and the phase diagram established by Brink et al. (F. J. Brink, R. L. Whiters and L. Noren, *J. Solid State Chem.*, 161, 31-37 (2001)). FIG. 3 shows the iron oxyfluoride materials oxygen content plotted versus c-lattice parameters. The solution fabrication process allows the fabrication of $FeO_xF_{2-x}$ compounds where x spans over the entire x range (FIG. 3) from pure $FeF_2$ (when annealed in Ar for 4 hours) to pure FeOF (when annealed at 250° C. for 8 hours). However, a slight decomposition of FeOF into $Fe_2O_3$ and $FeF_3$ resulted when the annealing temperature was raised to 300° C. in air for 4 hours, as evidenced by the emergence of additional reflections of low intensity, which could be associated to both phases (FIG. 1). Broad and low intensity diffraction peaks combined with the similarity of the lattice parameters of $FeF_3$ and $\alpha$-$Fe_2O_3$, which also crystallize in the same space group R-3c, make the distinction of both phases difficult.

Example 2

Carbon-Iron (Oxy)Fluoride Nanocomposites

Example 2.1

Synthesis of Carbon-$FeF_2$ Nanocomposites

Figure 4:
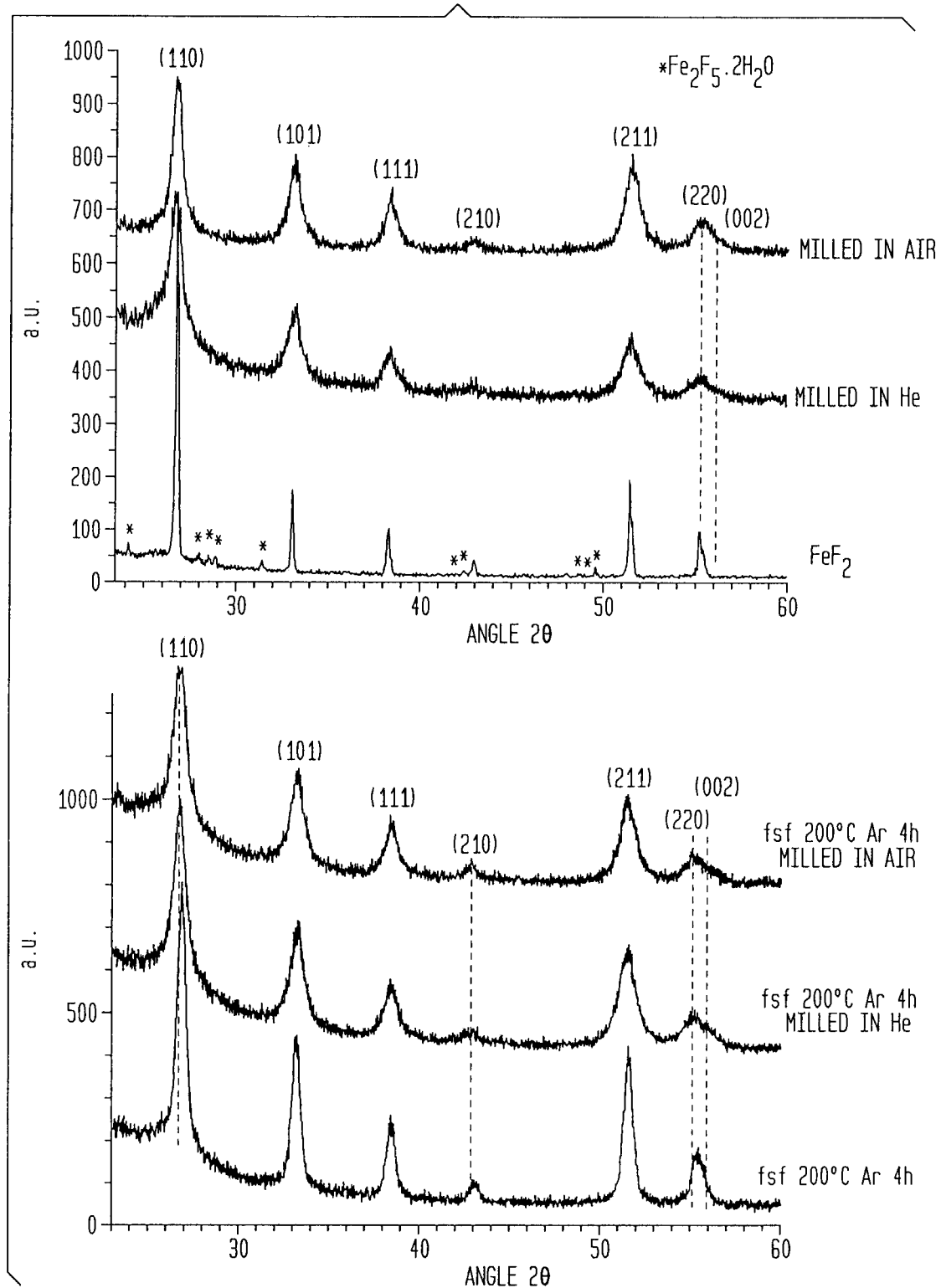
FIG. 4 shows XRD data illustrating the carbon-based $FeF_2$ nanocomposites maintained their initial tetragonal $P4_2/mnm$ system symmetry.

Carbon-iron fluoride nanocomposites were fabricated by mechanical milling of activated carbon with (i) solution fabrication process derived $FeF_2$, or (ii) commercial $FeF_2$. The milling vessel was loaded and sealed either in a helium (He)-filled glove box or in a dry room with <1% humidity (air). High energy milling in either air or He did not affect the iron fluoride core crystal structure significantly. The carbon-based nanocomposites maintained their initial tetragonal $P4_2/mnm$ system symmetry as demonstrated by XRD, shown in FIG. 4. However, milling induced a slight change in the lattice parameters correlated to the splitting of the (220) and (002) Bragg peaks in the 55° 2θ region. This phenomenon was more pronounced with the solution fabrication process derived $FeF_2$, where the splitting stems from a small increase of the a-lattice parameter, which is concomitant with a small decrease of the c-lattice parameter (Table 2).

TABLE 2

| | Unit Cell Vol. (Å$^3$) | a lattice parameter (Å) | c lattice parameter (Å) | Crystallite Size (nm) | BET S.A. (m$^2$/g) |
|---|---|---|---|---|---|
| Samples | | | | | |
| Commercial $FeF_2$ | 72.61 | 4.690 ± .002 | 3.300 ± .004 | >100 | 1.4 |
| Solution-based $FeF_2$ Nanocomposites with 15% Activated carbon | 72.69 | 4.690 ± .003 | 3.304 ± .005 | 22 | 136 |
| Commercial $FeF_2$ Milled in He | 72.97 | 4.699 ± .005 | 3.305 ± .008 | 11 | 75 |
| Commercial $FeF_2$ Milled in air | 72.87 | 4.696 ± .004 | 3.304 ± .006 | 15 | 81 |
| Solution-based $FeF_2$ Milled in He | 72.93 | 4.703 ± .005 | 3.298 ± .009 | 12 | 47 |
| Solution-based $FeF_2$ Milled in air | 72.93 | 4.703 ± .005 | 3.297 ± .008 | 12 | 51 |

Finally, milling resulted in the broadening of the diffraction peaks. This was associated with the reduction of the iron fluoride nanocrystalline regions down to 12-15 nm based on the Scherrer formula utilizing the (110) Bragg peak (Table 2) and was more significant with the initially macro structured commercial material.

Figure 5:
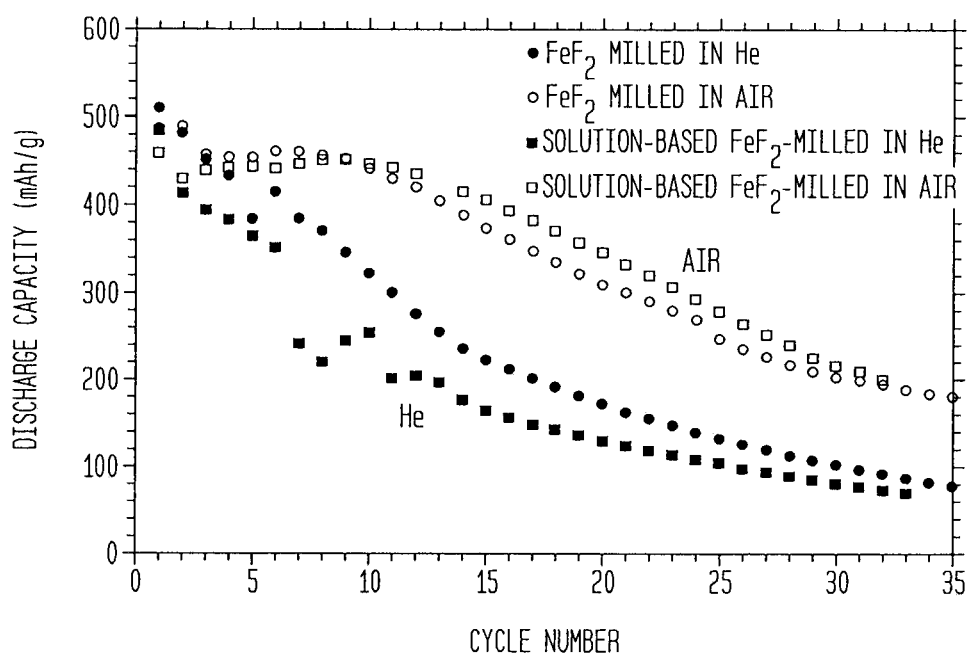
FIG. 5 shows the discharge specific capacity of $FeF_2$ nanocomposites plotted as a function of cycle number. All samples exhibited poor cycle life; improved cycling stability was observed for the nanocomposites milled in air compared to those milled in He.

The milling atmosphere did not affect significantly the bulk structure of the nanocomposites obtained from the solution fabrication process derived $FeF_2$ and the commercial $FeF_2$, however it had a significant impact on the materials electrochemical performance. The electrochemical testing was performed utilizing two-electrode coin cells (Hohsen, CR2032, 20 mm diameter and 3.2 mm thick) assembled in a He-filled dry box using a lithium foil counter electrode and glass fiber separators (GF/D, Whatman) saturated with 1M $LiPF_6$ in ethylene carbonate:dimethyl carbonate electrolyte (50:50 in vol. %). The cells were cycled at 60° C. under a constant current of 50 mA/g between 1.5 and 4.5V. As shown in FIG. 5 where the discharge capacity, of the nanocomposites which include 15% activated carbon, is plotted as a function of cycle number, while all samples exhibited poor cycle life, improved cycling stability was observed for the nanocomposites milled in air compared to the nanocomposites milled in He. Such improvement was observed regardless of the iron fluoride ($FeF_2$) source, i.e., whether commercial or solution fabrication process derived.

A small increase in Brunauer, Emmet and Teller (BET) surface area was observed for the nanocomposites obtained after milling in air compared to milling in He using both $FeF_2$ sources (Table 2). Without being limited by theory, these results suggest that a change in the materials surface morphology and chemistry most likely occurred during milling in air and further suggests that the surface chemistry, rather than bulk chemistry, is the origin of the improved stability observed for the nanocomposites fabricated by milling in air. Thus, the formation of a thin surface layer of iron oxide or oxyfluoride may be beneficial to cycling stability.

Example 2.2

Synthesis of Carbon-$FeF_3$ Nanocomposites

Figure 6:
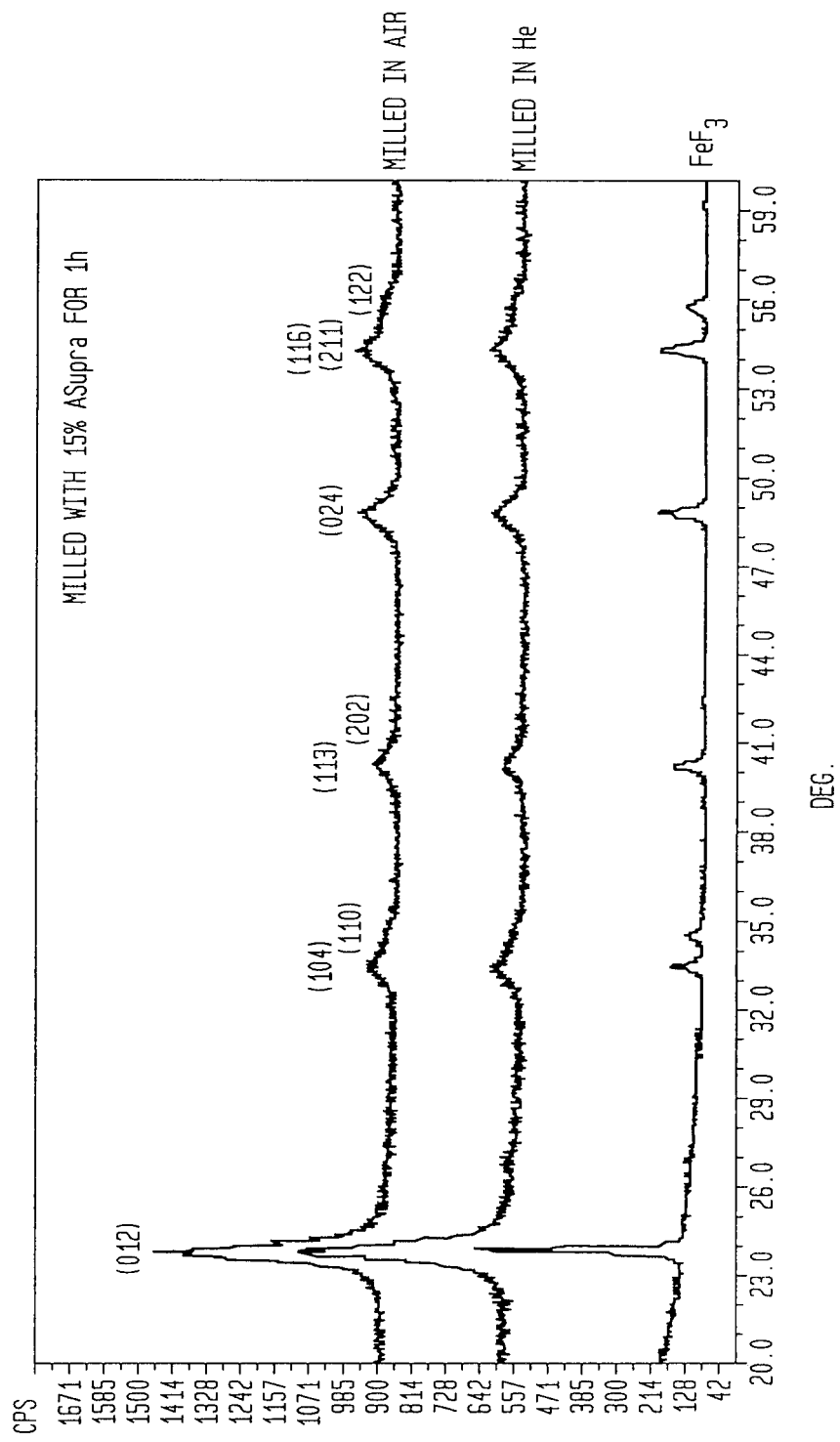
FIG. 6 shows XRD data illustrating the broadening of the Bragg reflection while the initial rhombohedral R-3c structure of $FeF_3$ is maintained after milling, regardless of the milling atmosphere. This is indicative of a reduction of crystallite size of $FeF_3$.
Figure 7:
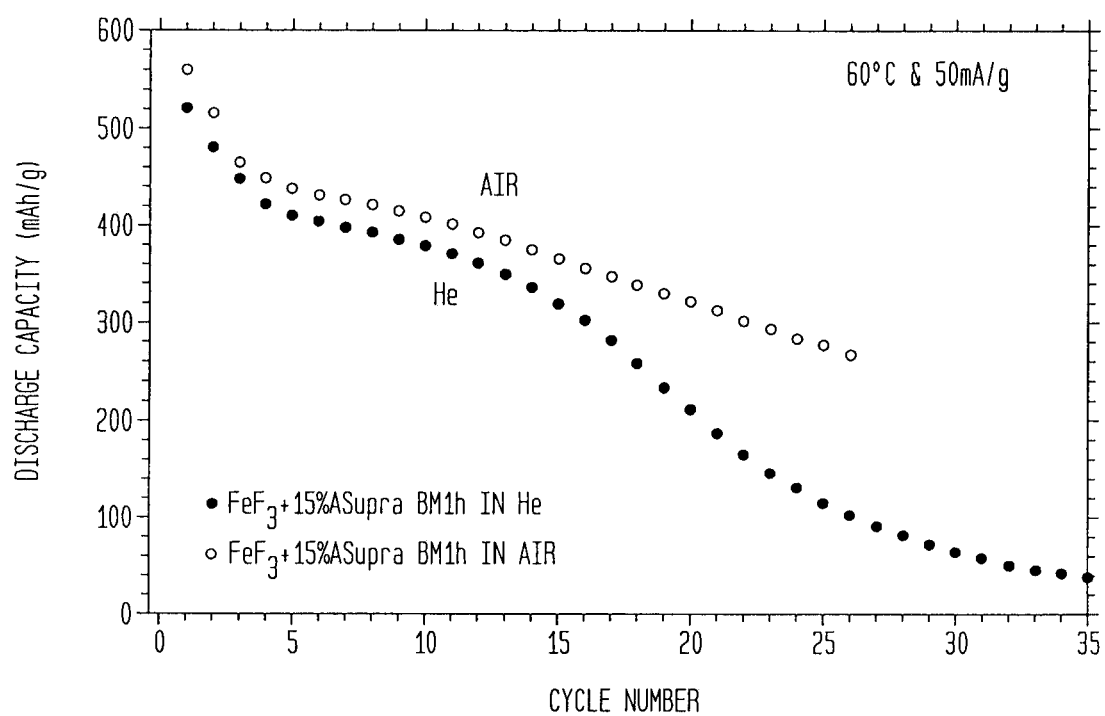
FIG. 7 shows a plot of discharge specific capacity (mAh/g) of $FeF_3$-based nanocomposites versus cycle number. Milling in air induced improved electrochemical performance over milling in He.

Carbon-iron fluoride nanocomposites were fabricated by mechanomilling of activated carbon with $FeF_3$. The milling cells were loaded with 1 gram of material including 15% activated carbon (ASupra® (Norit)) and milled in air or He. FIG. 6 shows XRD data for $FeF_3$ before and after milling Regardless of the milling atmosphere, a reduction of the crystallite size of $FeF_3$ (FIG. 6) (as indicated with the broadening of the Bragg reflection), is observed after milling while the initial rhombohedral R-3c structure of $FeF_3$ is maintained. FIG. 7 shows a plot of discharge specific capacity (mAh/g) versus cycle number. Milling in air induced improved electrochemical performance over milling in He (FIG. 7), similar to the results seen with the $FeF_2$ nanocomposites. The materials were cycled versus lithium (Li) metal at 60° C. under a constant current of 50 mA/g between 1.5V and 4.5V. Without being limited by theory, since the milling atmosphere did not affect the bulk structure and chemistry of $FeF_3$, this improvement likely is rooted in changes occurring at the surface of the $FeF_3$.

Example 2.3

Synthesis of Carbon Iron Oxyfluoride Nanocomposites

Carbon-iron oxyfluoride nanocomposites were fabricated utilizing iron (oxy)fluoride materials derived from the solution fabrication process. The iron (oxy)fluoride materials ($FeO_xF_{2-x}$) were of various compositions and included those over the entire range from pure $FeF_2$ to FeOF. These iron (oxy)fluorides were milled with 15 wt % activated carbon (ASupra®, Norit) for 1 hour. A total of 1 gram of material was loaded into hardened steel milling cells in a dry room with less than 1% humidity.

Figure 8:
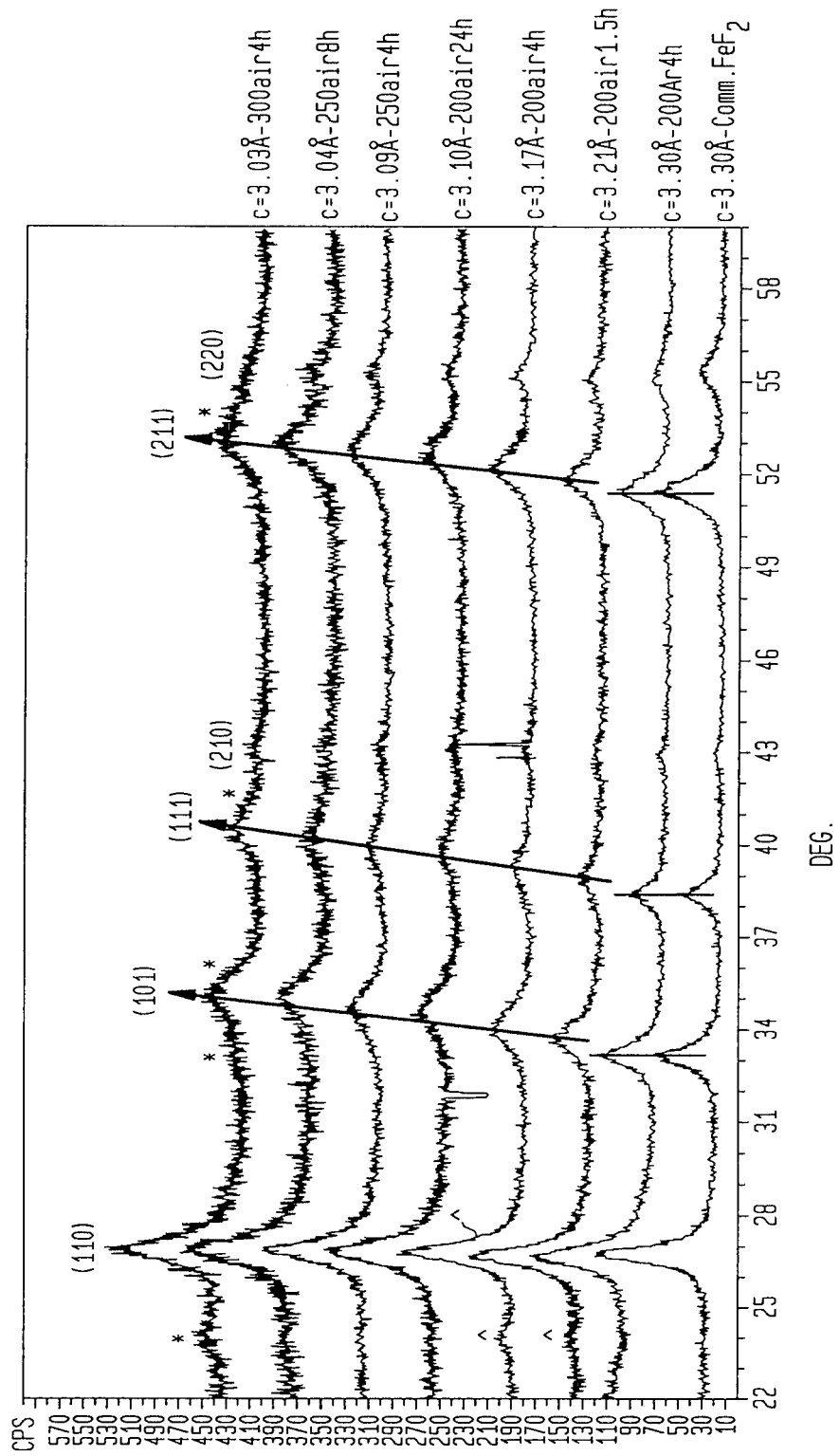
FIG. 8 shows XRD data illustrating that all the carbon-based nanocomposites retained the initial tetragonal $P4_2/mnm$ system symmetry. Milling in air did not affect the iron (oxy)fluoride core structure significantly.

Milling in air did not affect the iron (oxy)fluoride core structure significantly. FIG. 8 shows XRD data illustrating that all the carbon-based nanocomposites retained the tetragonal $P4_2/mnm$ system symmetry of the initial iron oxyfluoride. The change of the c-lattice parameters upon milling was non-statistically significant. Based on the phase diagram reported by Brink et al. (F. J. Brink, R. L. Whiters and L. Noren, *J. Solid State Chem.*, 161:31-37. 2001), the oxygen content of the $FeO_xF_{2-x}$ oxyfluoride-based nanocomposites spanned from x=0.28 to x=1 as the c-lattice parameters ranged from 3.212±.004 to 3.023±.013.

Trace amounts of $Fe_3F_8 \cdot 2H_2O$ were observed (FIG. 8) in the nanocomposites fabricated using solution-process derived iron oxyfluorides annealed in air at 200° C. for 1.5 hours and 4 hours. Additionally, the slight broadening of the diffraction peaks, which was more significant in the case of the initially macro structured commercial $FeF_2$, indicated that the iron (oxy)fluoride nanocrystalline regions of the resulting nanocomposites were reduced upon milling to 7-15 nm based on the Scherrer formula utilizing the (110) Bragg peaks.

Figure 9:
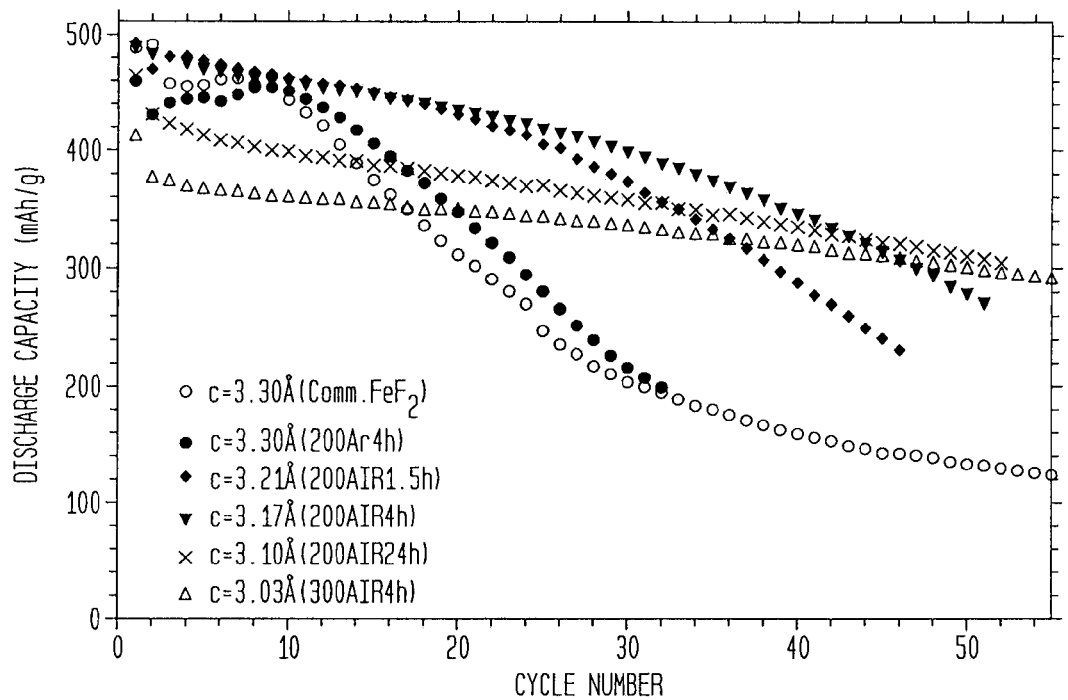
FIG. 9 shows a plot of the discharge specific capacity (mAh/g) of the oxyfluoride based nanocomposites versus cycle number compared to the $FeF_2$-based nanocomposites (fabricated from the commercial and solution-based fluorides). All oxyfluoride-based nanocomposites showed improved cycling stability compared to the $FeF_2$-based nano composites.

Cathodes comprising the nanocomposites were tested in 2-electrode coin cells using a lithium metal counter electrode under constant current (50 mA/g) between 1.5V and 4.5V at 60° C. The electrolyte consisted of 1M $LiPF_6$ in ethylene carbonate-dimethyl carbonate (EC-DMC 50:50 v/v). FIG. 9 shows the specific discharge capacity (mAh/g) of the oxyfluoride-based nanocomposites including 15% of activated carbon plotted as a function of cycle number and compared to the $FeF_2$-based nanocomposites fabricated (i.e., from the commercial and solution fabrication process derived $FeF_2$). All oxyfluoride-based nanocomposites showed improved cycling stability compared to the $FeF_2$-based nanocomposites.

Figure 10:
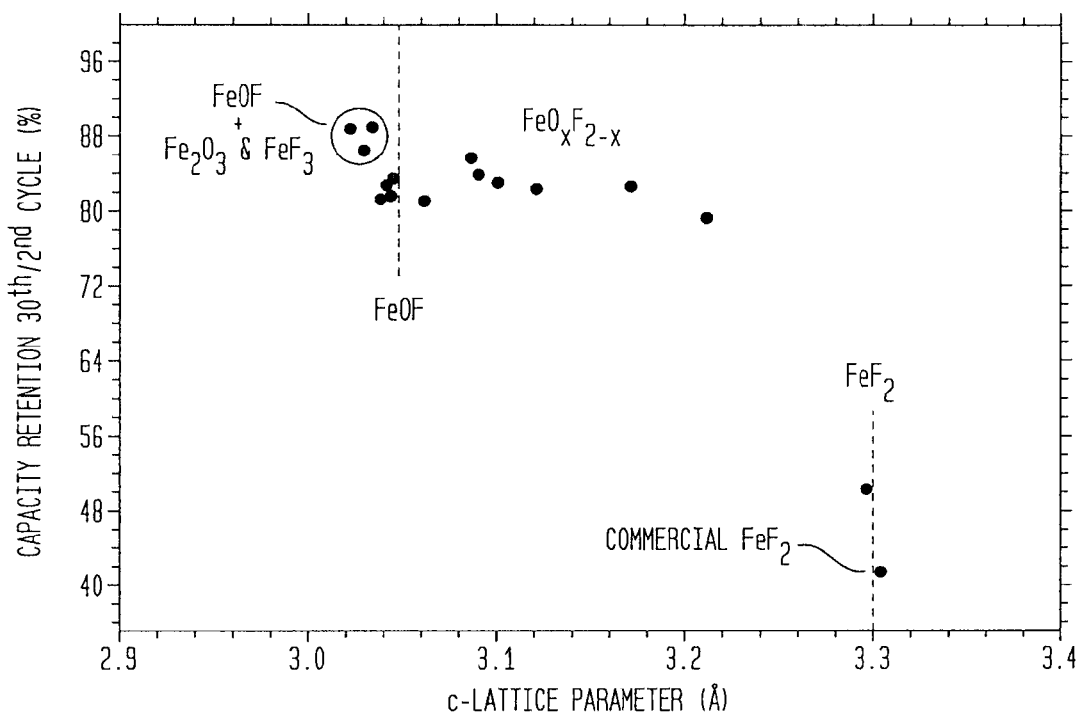
FIG. 10 shows the capacity retention (defined as the ratio of the discharge capacity obtained in the $30^{th}$ cycle compared to the $2^{nd}$ cycle) versus c-lattice parameter. Data shows improved capacity retention with increasing oxygen content determined by the decrease in c-lattice parameter.

The capacity retention was evaluated after 30 cycles by plotting the discharge capacity ratio of the $30^{th}$ to the $2^{nd}$ cycle versus the nanocomposite c-lattice parameters. As shown in FIG. 10, the introduction of oxygen into the fluoride structure (as opposed to the introduction of oxygen onto the surface as demonstrated in Example 1) was observed to have a beneficial impact on cycle life. The cycling efficiency rose from 40-50% for the commercial $FeF_2$ and solution fabrication process derived $FeF_2$ materials to 79-89% for the oxyfluoride materials. For comparison, a $FeF_3$-based nanocomposite exhibited a 54.1% cycling efficiency when tested under the same protocol.

After the significant increase induced by minimal oxygen substitution, the data in FIG. 10 suggests a continuous increase of capacity retention with decreasing c-lattice parameter within the 3.21-3.09 Å range, which corresponds to an increase in oxygen content (x) from 0.28 to 0.75 in the $FeO_xF_{2-x}$ compounds (approximate values). Cycling stability was not improved further by increasing the oxygen content to produce pure FeOF. However, further cycle life improvement was achieved when oxidation, during the oxyfluoride fabrication, was pushed beyond pure FeOF, leading to the formation of small amounts of $Fe_2O_3$ and $FeF_3$. The improvement in cycle life brought about by the introduction of oxygen into the oxyfluoride structure was achieved at the expense of initial discharge capacity.

Example 2.4

Synthesis of Carbon-Iron Fluoride-Iron Oxyfluoride-Nanocomposites

Figure 11:
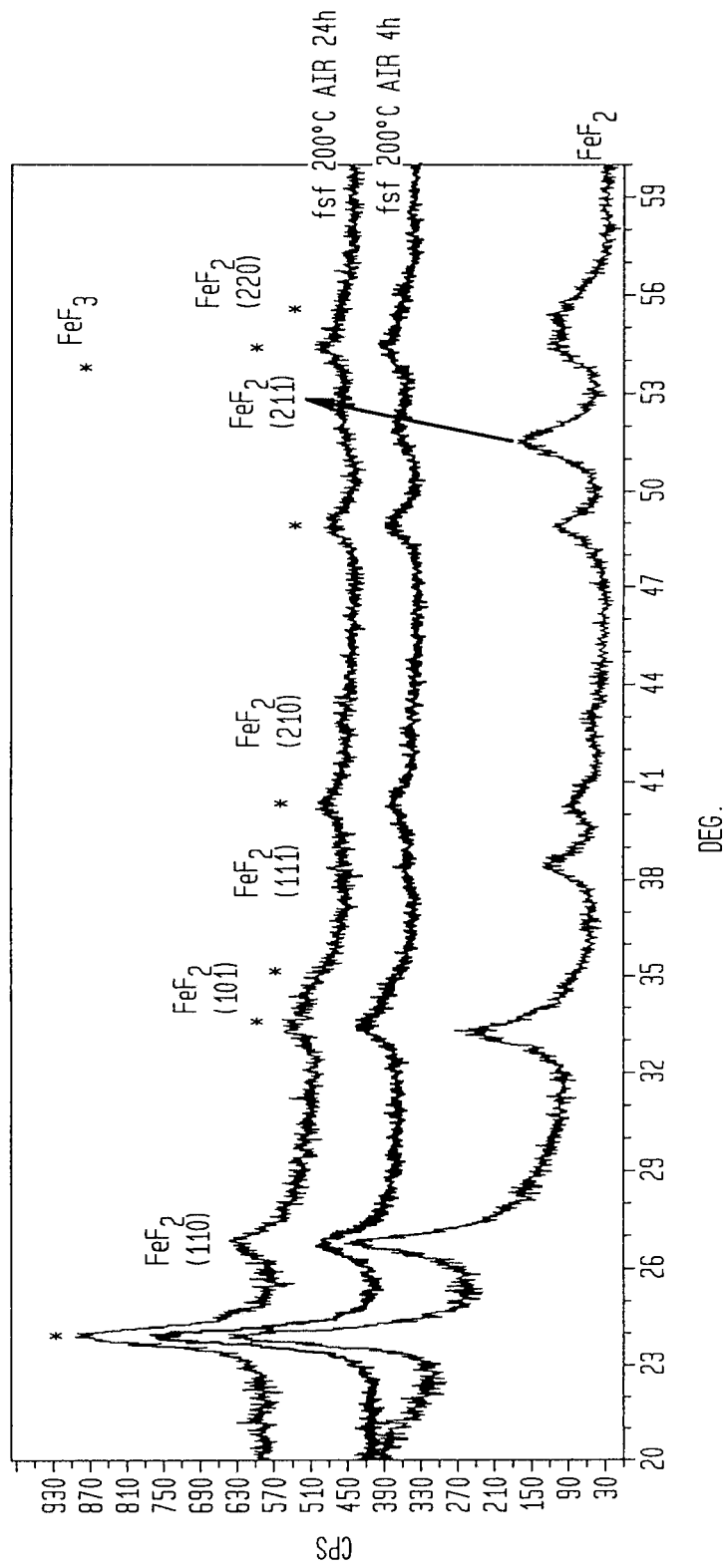
FIG. 11 shows the XRD pattern of the nanocomposites obtained by milling mixtures of iron (oxy)fluoride and $FeF_3$ with carbon in He. The tetragonal $P4_2/mnm$ phase associated to $FeF_2$ or the oxyfluoride and the rhombohedral R-3c phase associated to FeF3 were maintained.
Figure 12:
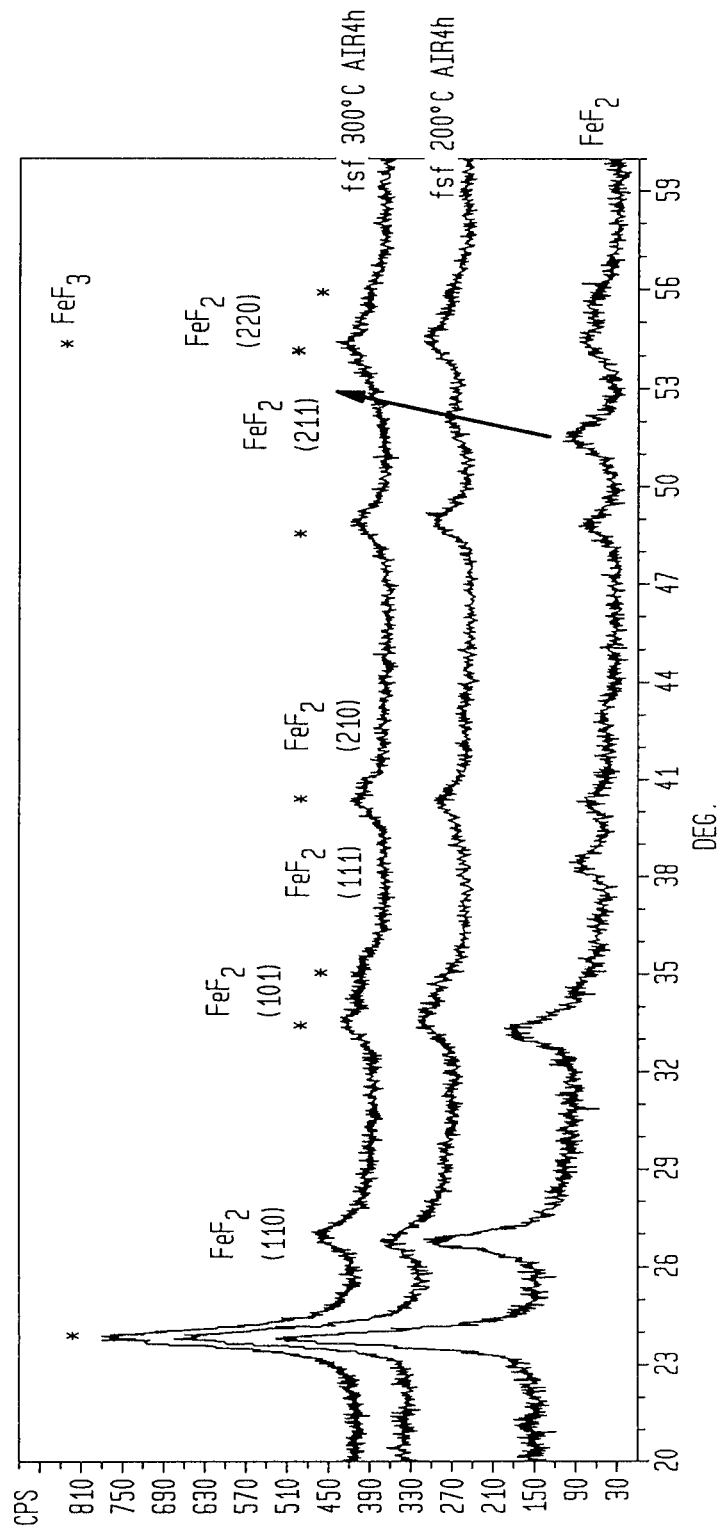
FIG. 12 shows the XRD pattern of the nanocomposites obtained by milling mixtures of iron (oxy)fluoride and $FeF_3$ with carbon in air. The tetragonal $P4_2/mnm$ phase associated to $FeF_2$ or the oxyfluoride and the rhombohedral R-3c phase associated to FeF3 were maintained.

Carbon-iron (oxy)fluoride nanocomposites were fabricated. Mixtures of $FeF_3$ with commercial $FeF_2$ or solution fabrication process derived oxyfluorides were milled with activated carbon for 1 hour using high energy milling. Various compositions could be utilized. In this example, the nanocomposites were fabricated from a 43.5 wt % of $FeF_2$ or oxyfluoride, 43.5 wt % $FeF_3$ and 13 wt % of activated carbon (ASupra®, Norit) mixture. Material (1 gram) was milled either in He or in air. The XRD patterns of the nanocomposites obtained by milling in He, as shown in FIG. 11, and the XRD patterns of the nanocomposites obtained by milling in air, as shown in FIG. 12, indicate that in both cases, the tetragonal $P4_2/mnm$ phase associated with $FeF_2$ or the oxyfluoride and the rhombohedral R-3c phase associated to FeF3 were maintained.

Figure 13:
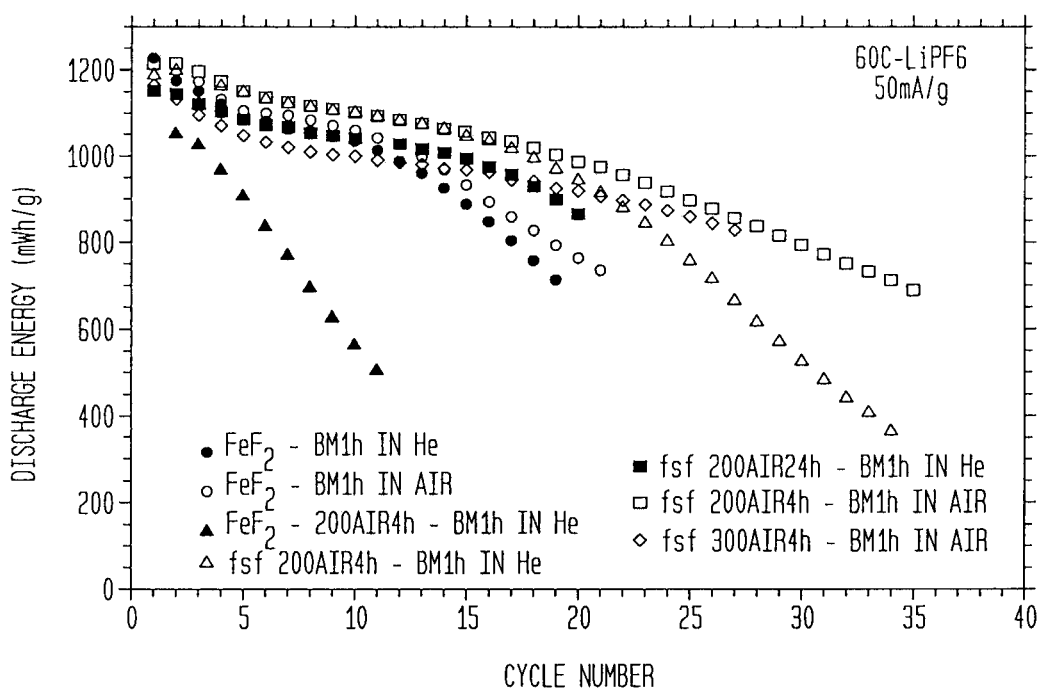
FIG. 13 shows that milling in air mixtures of iron (oxy) fluorides+$FeF_3$ resulted in improved cycling stability with similar energy density compared to the nanocomposites obtained by milling in He.

Cycling was performed in 2-electrode coin cells versus lithium metal at 60° C. under constant current, 50 mA/g, between 1.5V and 4.5V. FIG. 13 shows a plot of discharge specific energy density (mWh/g) versus cycle number. Milling of mixtures of $FeO_xF_{2-x}+FeF_3$ in air resulted in improved cycling stability with similar energy density compared to the nanocomposites obtained by milling in He (FIG. 13). These results are consistent with those observed with the $FeO_xF_{2-x}$ nanocomposites and $FeF_3$-nanocomposites discussed in previous examples. Further, the introduction of oxygen into the rutile-type-structure to form $FeO_xF_{2-x}$ oxyfluorides was beneficial to the cycling stability of the materials compared to pure fluoride $FeF_2$ even in the presence of $FeF_3$.

Example 2.5

Synthesis of Carbon-Iron Fluoride Nanocomposites: Post-Mill Annealing

The previous examples have shown how the oxygen content of the initial oxyfluorides can be modified prior to milling. However, the oxygen content of the nanocomposites also can be increased by performing post-mill anneals at elevated temperature in oxygen containing atmospheres.

Example 2.5.1

Effect of Post-Mill Annealing Temperature

In this embodiment, the effect of post-mill annealing temperature on nanocomposites fabricated by milling an oxyfluoride obtained after annealing the $FeSiF_6$ hydrate powder at 200° C. for 4 hours by the solution fabrication process with 15 wt % activated carbon for 1 hour in air was investigated. The XRD patterns of the nanocomposite with the air post-mill anneal temperatures increasing from 200° C. to 400° C. were obtained. A post-mill anneal also was performed in oxygen at 300° C. All post-mill anneals were performed for 2 hours.

Figure 14:
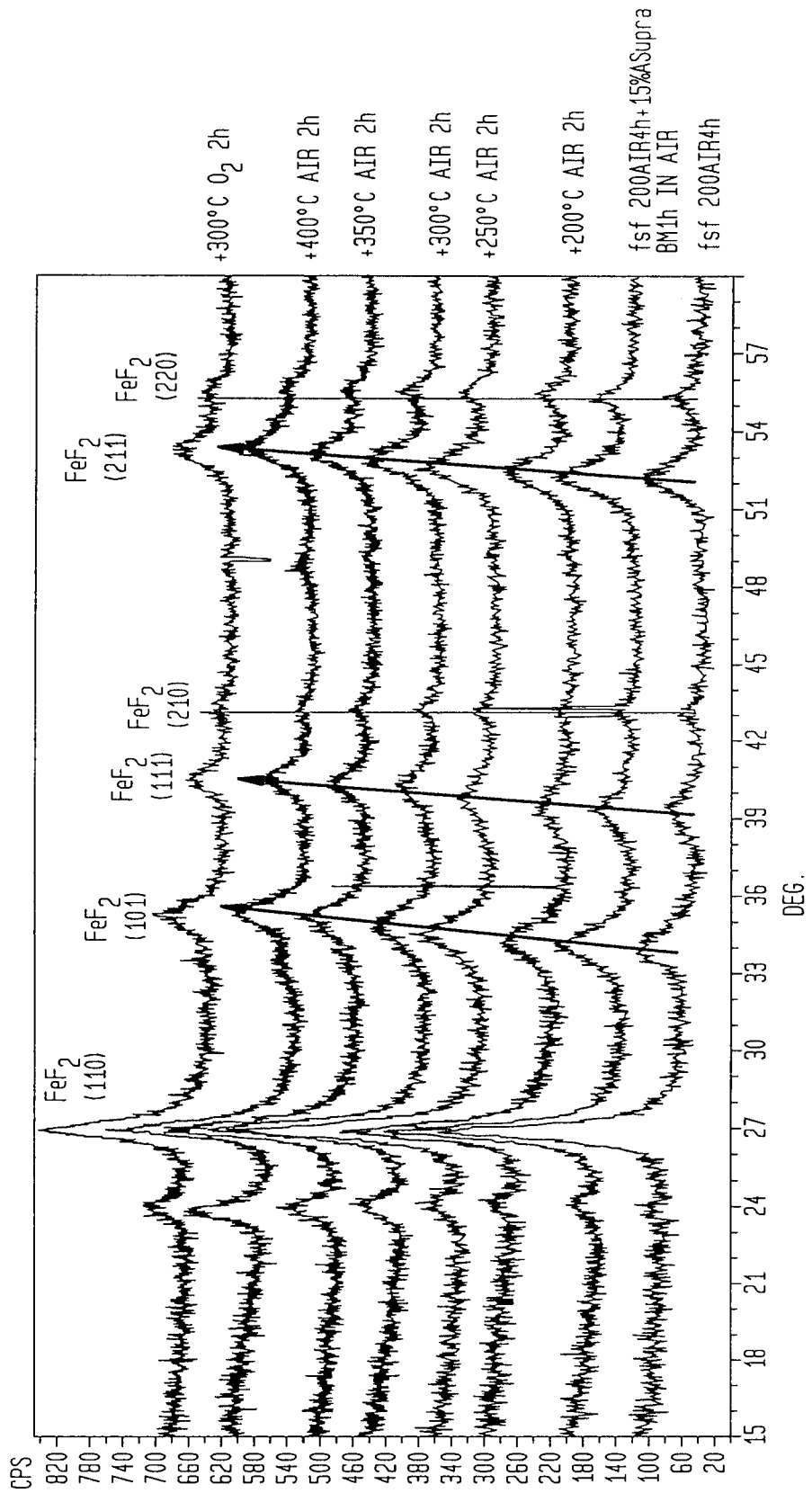
FIG. 14 shows (i) the evolution of the XRD patterns of an oxyfluoride-based nanocomposite with the air post-mill anneal temperatures increasing from 200 to 400° C., and (ii) the XRD patterns of the initial oxyfluoride along with the nanocomposite obtained after milling. The nanocomposite oxyfluoride oxygen content increased with post-mill anneal temperature as indicated with the systematic shift of the tetragonal $P4_2/mnm$ (hkl) diffraction peaks towards larger angles. Partial decomposition of the $FeO_xF_{2-x}$ phase into $Fe_2O_3+FeF_3$ becomes more significant after annealing at higher temperature as shown with the intensity increase of the diffraction peak in the 24° region. A post-mill anneal also was performed in oxygen at 300° C. All post-mill anneals were performed for 2 hours.

FIG. 14 shows the XRD patterns of the initial oxyfluoride along with the nanocomposite obtained after milling and post-mill heat-treatment. The nanocomposites oxyfluoride oxygen content increased with post-mill anneal temperature as indicated by the systematic shift of the tetragonal $P4_2/mnm$ (hk1) diffraction peaks towards larger angles. Partial decomposition of the $FeO_xF_{2-x}$ phase into $Fe_2O_3+FeF_3$ becomes more significant after annealing at higher temperature as indicated with the intensity increase of the diffraction peak in the angle $2\theta$ 24° region.

Figure 15:
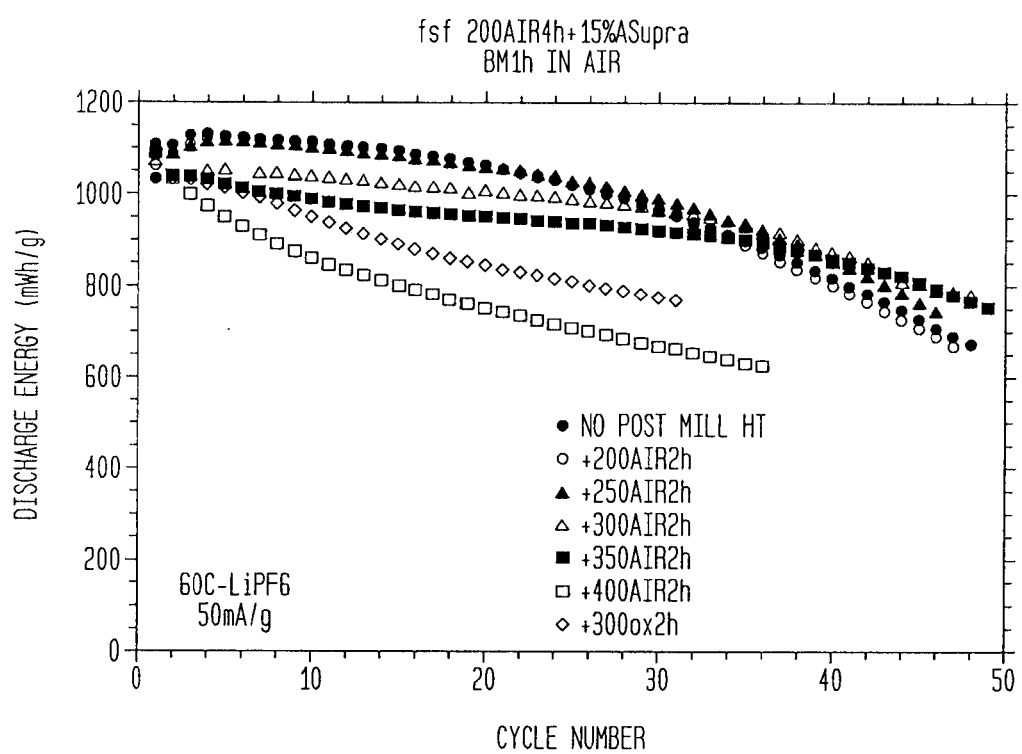
FIG. 15 shows the discharge specific energy density (mWh/g) plotted as a function of cycle number. Cycling stability improved with post-mill annealing temperatures up to 350° C., while temperature rise beyond 350° C. was detrimental to the nanocomposite electrochemical performance.

The nanocomposites were tested versus lithium metal utilizing 2-electrode coin cells at 60° C. at 50 mA/g between 1.5V and 4.5V. As shown in FIG. 15, the discharge specific energy density was plotted as a function of cycle. The impact on the materials electrochemical performance is more significant above 250° C. with improved cycling stability and lower discharge energy. However rising the temperature beyond 350° C. was detrimental. While the 300° C. post-mill anneal in air was beneficial, the 300° C. post-mill anneal in oxygen appeared to be detrimental to the materials electrochemical performance. Optimal performance was obtained with limited oxidation.

Example 2.5.2

Effect of Post-Mill Annealing Temperature

Figure 16:
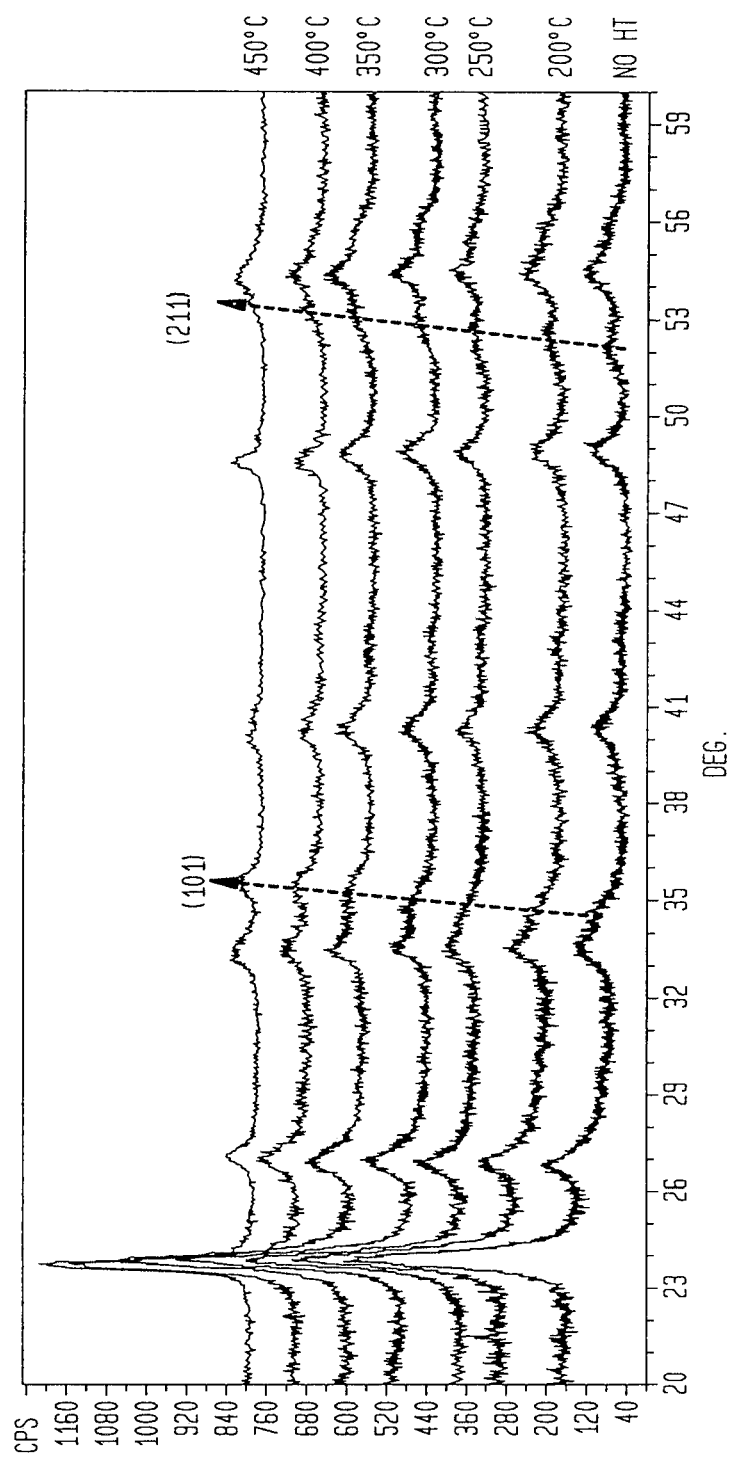
FIG. 16 shows XRD data of ($FeO_xF_{2-x}+FeF_3$)-nanocomposites illustrating the (101) and (211) peaks of the tetragonal $FeO_xF_{2-x}$ systematically shift towards larger angles with the post-mill air annealing temperature increasing from 200 to 450° C. Increasing the post-mill anneal temperature leads to a systematic increase of the nanostructured oxyfluoride oxygen content.

In this embodiment, nanocomposites obtained from 50 wt %-50 wt % mixtures of iron oxyfluoride and $FeF_3$ with 13 wt % activated carbon (ASupra®) were submitted to post-mill anneals in air for 2 hours. FIG. 16 shows the XRD patterns that resulted. FIG. 16 shows that as annealing temperature increased from 200° C. to 450° C., the (101) and (211) peaks of the tetragonal $FeO_xF_{2-x}$ systematically shift towards larger angles. An increase in the post-mill anneal temperature leads to a systematic increase of the nanostructured oxyfluoride oxygen content. The decomposition of $FeO_x F_{2-x}$ at elevated temperature observed previously in Example 2.4 would be more difficult to detect in this example due to the presence of the initial $FeF_3$. Indeed, the (012) reflection of $FeF_3$ and $Fe_2O_3$ emerge at 23.8° and 24.1° respectively.

Figure 17:
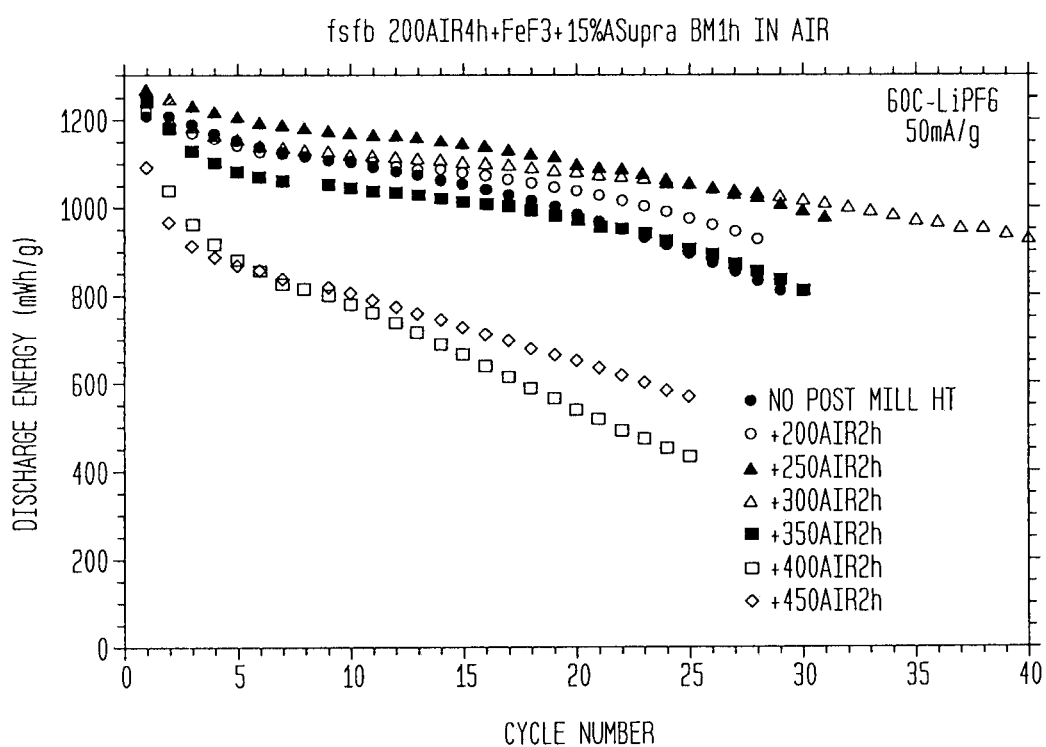
FIG. 17 shows the discharge specific energy density (mWh/g) of ($FeO_xF_{2-x}+FeF_3$)-nanocomposites plotted as a function of cycle number. Cycling versus lithium metal at 60° C. under a constant current of 50 mA/g between 1.5 and 4.5V demonstrates systematic improvement of the nanocomposite electrochemical performance with a post-mill annealing temperature increase up to 300° C.

Cycling versus lithium metal in 2-electrode coin cells at 60° C. under a constant current of 50 mA/g between 1.5V and 4.5V (FIG. 17) reveals systematic improvement of the nanocomposite electrochemical performance with a temperature increase up to 300° C. Further increases resulted in the degradation of the materials electrochemical properties. The post-mill temperature range is 200-300° C. to obtain optimum performance of $FeO_xF_{2-x}$—$FeF_3$ based nano composites.

Example 2.5.3

Effect of Post-Mill Annealing Temperature

Figure 18:
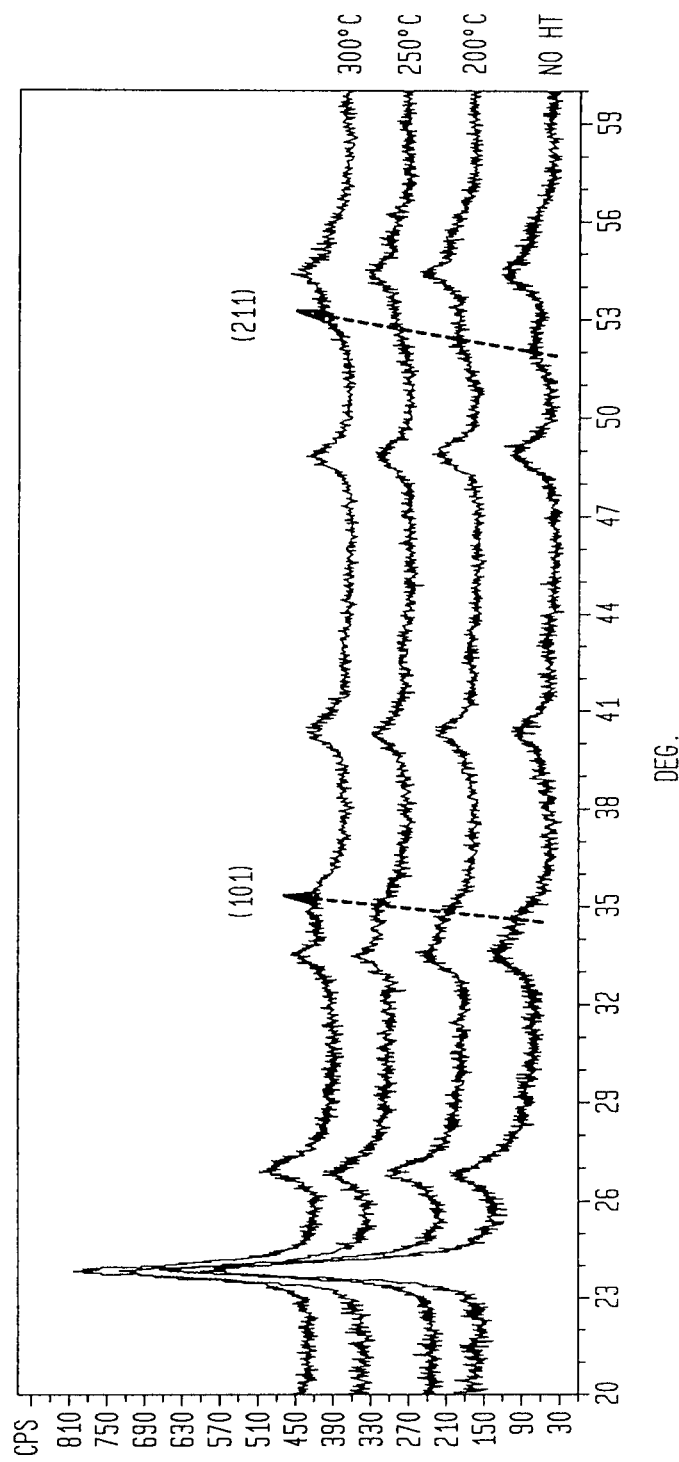
FIG. 18 shows XRD data of ($FeO_xF_{2-x}+FeF_3$)-nanocomposites illustrating the (101) and (211) peaks of the tetragonal $FeO_xF_{2-x}$ phase systematically shift towards larger angles with the oxygen post-mill annealing temperature increasing from 200 to 300° C. The oxygen post-mill anneal temperature increase leads to a systematic increase of the nanostructured $FeO_xF_{2-x}$ oxyfluoride oxygen content.

In this embodiment, nanocomposites obtained from 50 wt %-50 wt % mixtures of oxyfluoride and $FeF_3$ with 13 wt % activated carbon (ASupra®) were submitted to post-mill anneals in oxygen for 2 hours. Example 2.5.2 describes air post-mill anneals. FIG. 18 shows XRD data from the nanocomposites. As observed for the air post-mill anneals, as the annealing temperature increased from 200° C. to 300° C., the (101) and (211) peaks of the tetragonal $FeO_xF_{2-x}$ systematically shift towards larger (FIG. 18). Thus, the oxygen post-mill anneal temperature increase leads to a systematic increase of the nanostructured oxyfluoride oxygen content.

Figure 19:
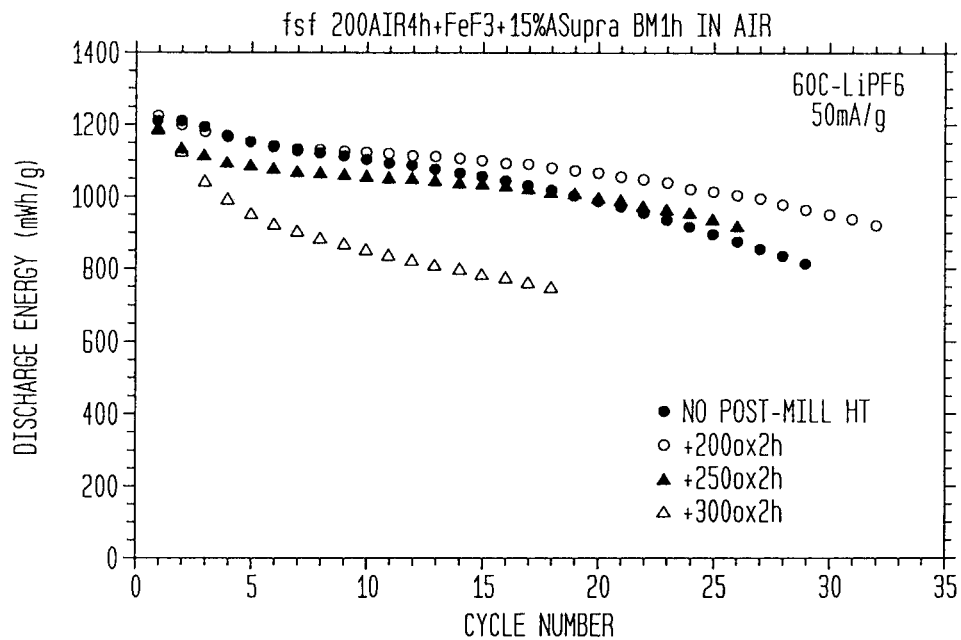
FIG. 19 shows the discharge specific energy density (mWh/g) of ($FeO_xF_{2-x}+FeF_3$)-nanocomposites plotted as a function of cycle number. The materials capacity retention improves with the oxygen post-mill anneal at 200° C. Post-mill anneals in oxygen performed at higher temperature are detrimental to the nanocomposites electrochemical performance.

The $FeO_xF_{2-x}$—$FeF_3$ based nanocomposites submitted to post-mill annealing in oxygen were tested versus lithium metal in 2-electrode coin cells. Cycling was performed at 60° C. under a constant current of 50 mA/g between 1.5V and 4.5V. FIG. 19 is a plot of discharge specific energy density versus cycle number under 4 conditions: (1) no post-mill; (2) 200° C. for 2 hours; (3) 250° C. for 2 hours; and (4) 300° C. for 2 hours. The materials' capacity retention improved with the oxygen post-mill anneal at 200° C. (FIG. 19). Post-mill anneals in oxygen performed at higher temperature are detrimental to the nanocomposites electrochemical performance.

Example 2.6

Cycling Over the 2.4-4.5V Range

Figure 20:
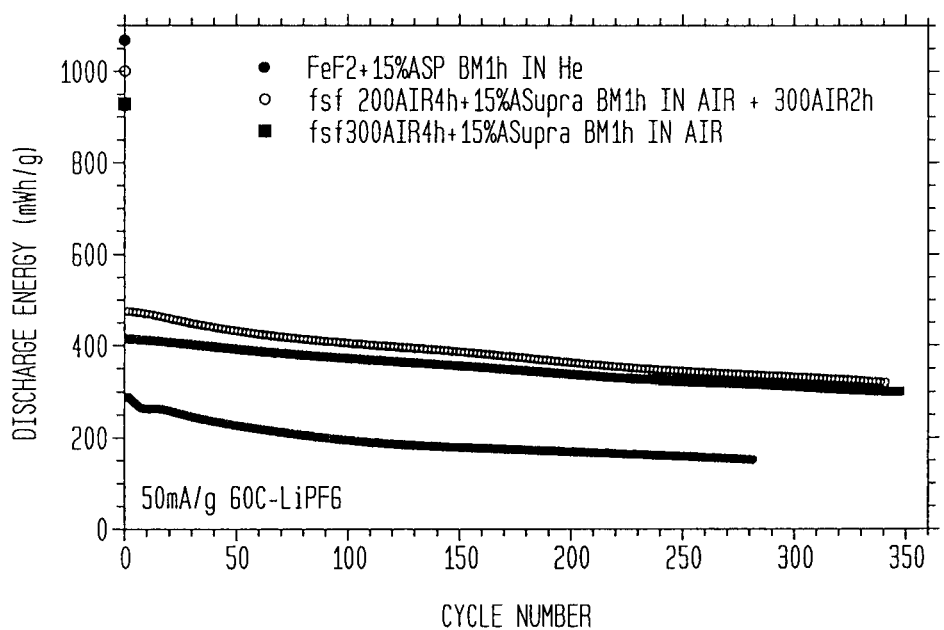
FIG. 20 shows the discharge specific energy density (mWh/g) plotted as a function of cycle number for two nanocomposites fabricated from nanostructured $FeO_xF_{2-x}$ obtained by the solution fabrication process compared to a commercial $FeF_2$-based nanocomposite. Cells were cycled at 60° C. between 2.4 and 4.5V. Both nanocomposites fabricated from the nanostructured $FeO_xF_{2-x}$ exhibited much improved electrochemical performance compared to the macro-$FeF_2$ based nanocomposite with higher energy density and better capacity retention upon cycling.

In this embodiment, electrochemical testing was narrowed to the 2.4-4.5V range. Previous electrochemical testing was performed between 1.5 and 4.5V. FIG. 20 shows the specific discharge energy density plotted versus the cycle number for (1) a nanocomposite fabricated from nanostructured $FeO_x F_{2-x}$, obtained by the solution fabrication process; (2) a nanocomposite fabricated from nanostructured $FeO_x F_{2-x}$ heated at 300° C. for 2 hours (after milling); and (3) a macro-$FeF_2$ based nanocomposite. Both nanocomposites (1) and (2) fabricated from the nanostructured $FeO_xF_{2-x}$ exhibited much improved electrochemical performance compared to the macro-$FeF_2$ based nanocomposite (3) in that they showed higher energy density and better capacity retention upon cycling.

Example 3

Manganese and Nickel Substitution

Figure 21:
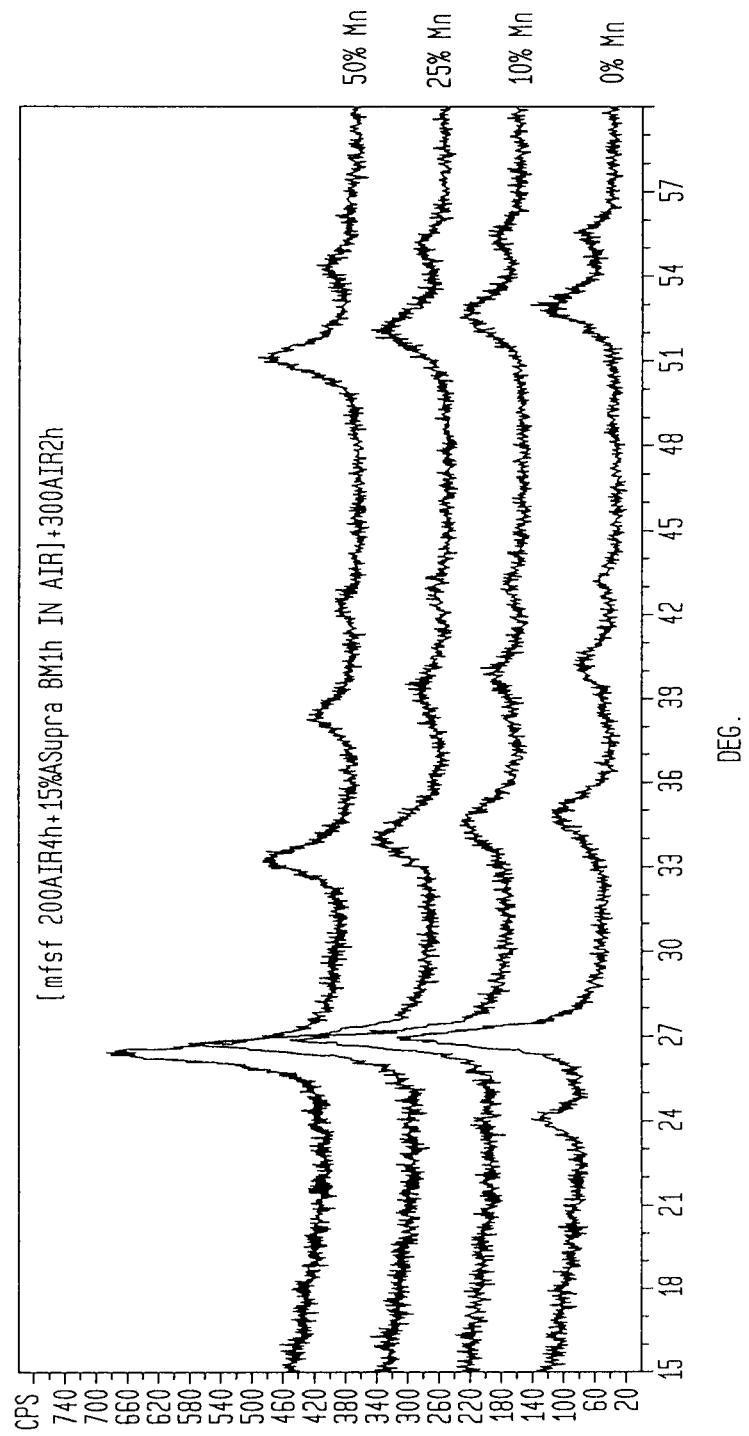
FIG. 21 shows the XRD patterns of the nanocomposites obtained with 10 wt % Mn-90 wt % Fe, 25 wt % Mn-75 wt % Fe and 50 wt % Mn-50 wt % Fe mixtures added to the hexafluorosilicic acid aqueous solution. The XRD for the 100 wt % Fe sample was added for comparison. All samples were obtained by milling the manganese or nickel substituted $FeSiF_6$ hydrate annealed for 4 hours in air with 15 wt % activated carbon (ASupra) for one hour in air. The nanocomposites then were submitted to a 2 hour air anneal at 300° C. after milling.
Figure 22:
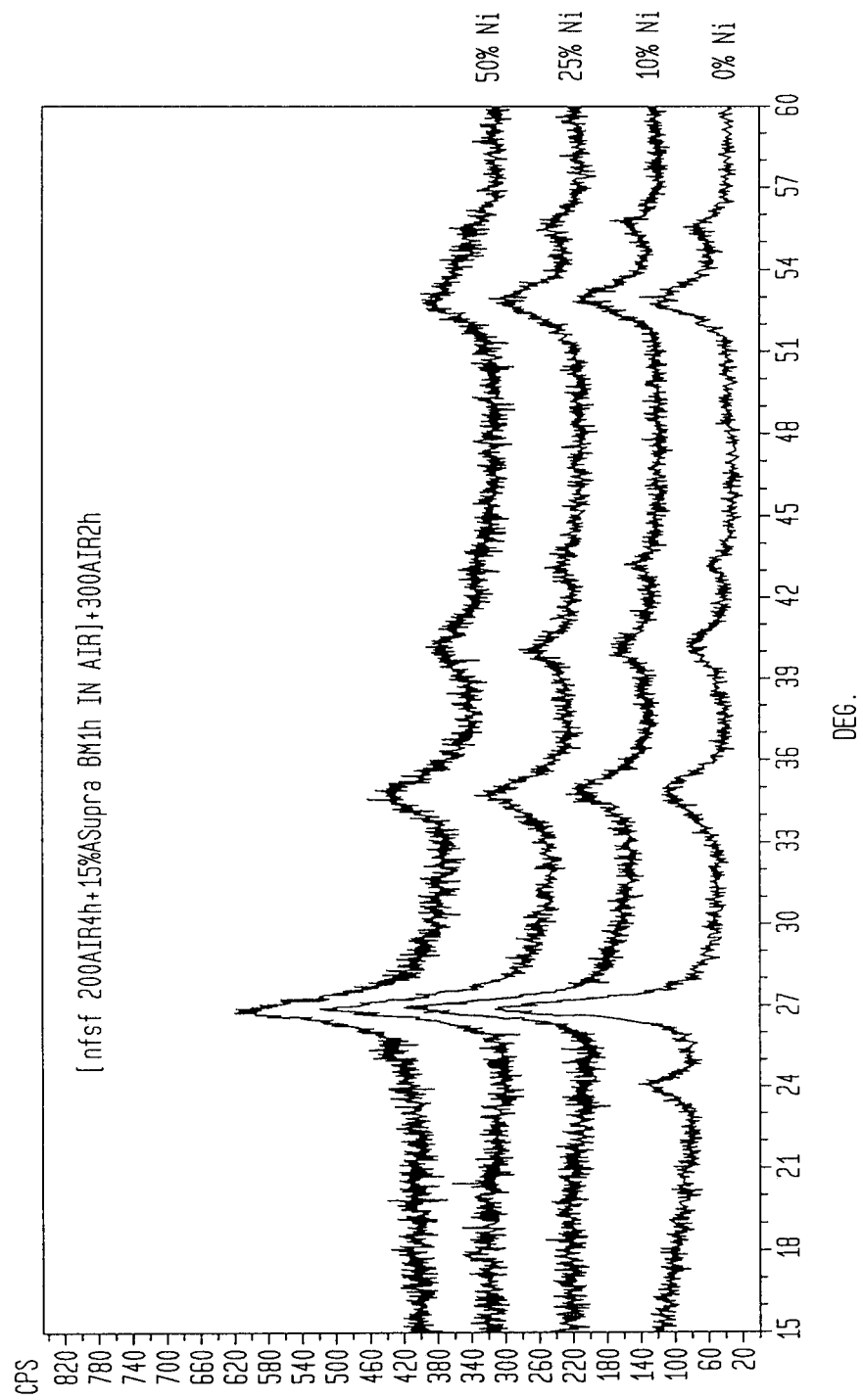
FIG. 22 shows the XRD the patterns obtained with the addition of nickel to iron. All nanocomposites maintained the tetragonal $P4_2/mnm$ structure.

In this embodiment, manganese and nickel were added to metal iron in the solution fabrication process. FIG. 21 shows the XRD patterns of the nanocomposites obtained when (1) 10 wt % Mn-90 wt % Fe, (2) 25 wt % Mn-75 wt % Fe and (3) 50 wt % Mn-50 wt % Fe mixtures were added to the hexafluorosilicic acid aqueous solution. The XRD for the 100 wt % Fe sample was added for comparison. FIG. 22 shows the patterns obtained with the addition of nickel to iron in similar proportions. All samples were obtained by milling the manganese or nickel substituted $FeSiF_6$ hydrate annealed for 4 hours in air with 15 wt % activated carbon (ASupra) for one hour in air. The nanocomposites then were submitted to a 2 hour air anneal at 300° C. after milling. FIG. 21 and FIG. 22 show that all nanocomposites maintained the tetragonal $P4_2/mnm$ structure. As shown in Table 3, the systematic shift of the diffraction peaks towards smaller angle with the amount of added manganese is associated with an increase of tetragonal unit cell volume upon substitution of the larger $Mn^{2+}$ for $Fe^{2+}$ in the rutile-type structure. In the case of the addition of nickel, the structure volume change is less significant. In the nickel case a phase separation seems to occur forming a nanocomposite of iron oxyfluorides and nickel fluorides.

TABLE 3

| Nanocomposites With 15% ASupra | Unit Cell Vol. (Å$^3$) | a lattice parameter (Å) | c lattice parameter (Å) | Crystallite Size (nm) |
|---|---|---|---|---|
| 0% Mn | 67.39 | 4.683 ± .007 | 3.073 ± .010 | 13 |
| 10 wt % Mn | 68.43 | 4.692 ± .004 | 3.108 ± .007 | 13 |
| 25 wt % Mn | 70.44 | 4.718 ± .001 | 3.164 ± .001 | 13 |
| 50 wt % Mn | 74.33 | 4.779 ± .002 | 3.254 ± .003 | 13 |

Figure 23:
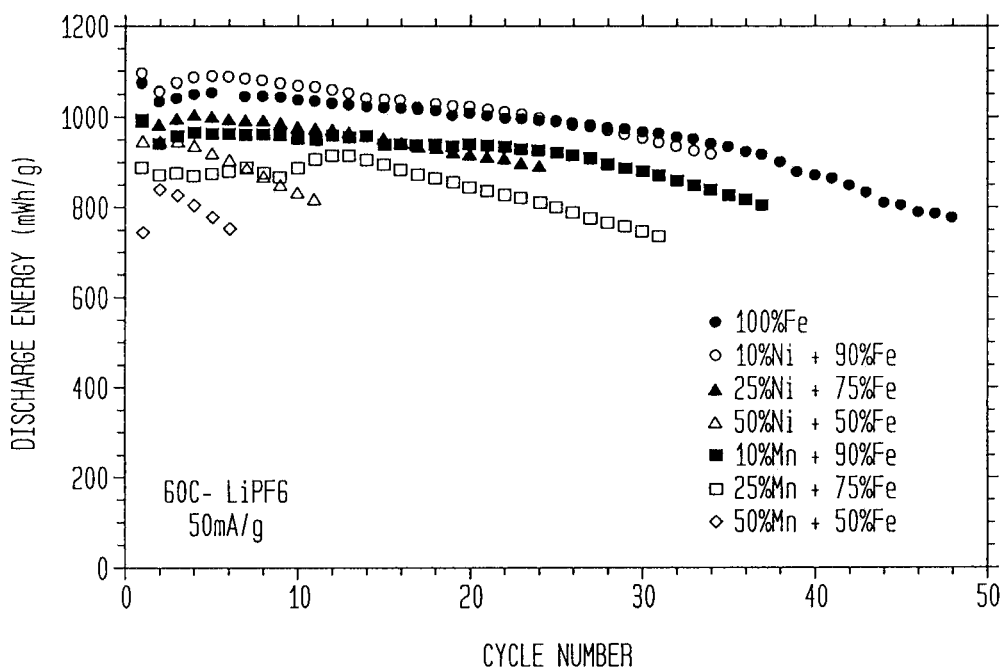
FIG. 23 shows the discharge specific energy density of the Mn and Ni substituted nanocomposites plotted as a function of cycle number.

FIG. 23 shows the discharge specific energy density of the Mn and Ni substituted iron oxyfluoride nanocomposites plotted as a function of cycle number. The materials were tested at 60° C. between 1.5 and 4.5V under a constant current of 50 mA/g. It shows that although all nanocomposites exhibited electrochemical activity, the addition of 10 to 50 wt % of Mn or Ni did not improve electrochemical performance. This was true more particularly at high substitution.

Example 4

Addition of Lithium-Based Phosphates

Without being limited by theory, in these examples, although a lithium phosphate based compound is utilized as a precursor, it is likely that after fabrication, various amounts of lithium phosphate, lithium iron phosphate, iron phosphate, iron fluorophosphates and lithium iron fluorophosphate may form through a chemical reaction between the iron fluoride/oxyfluoride and lithium phosphate compound. Further, similar improvement in electrochemical performance was observed with the use of $(NH_4)_2HPO_4$ and $NH_4H_2PO_4$ precursors suggesting that the presence of iron fluorophosphates or iron phosphate formed as a result of the chemical reaction with iron fluoride/oxyfluoride lead to the improved cycling stability observed.

Example 4.1

Lithium-Based Phosphates and Iron Fluoride Nanocomposites

Figure 24:
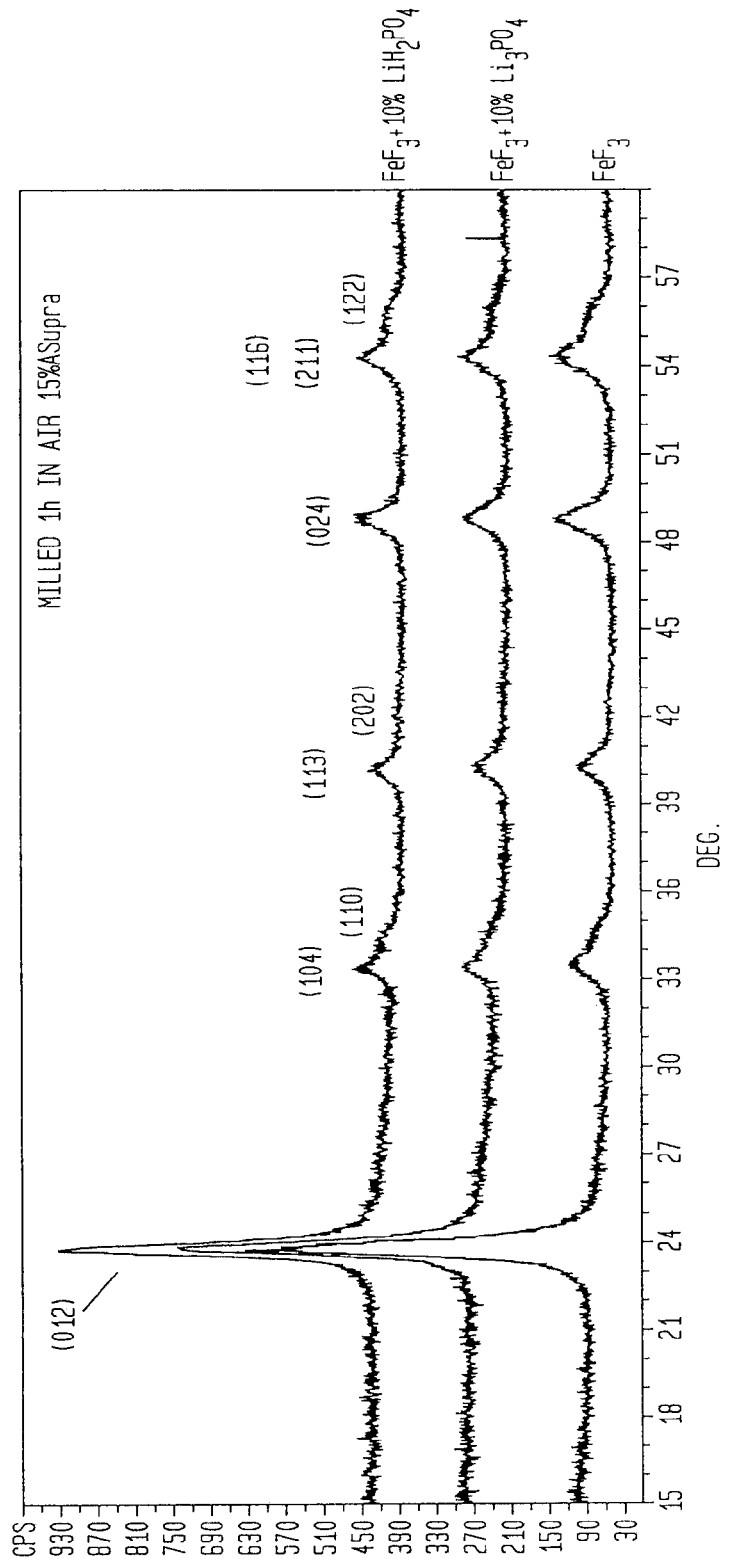
FIG. 24 shows XRD data illustrating the small addition of the lithium phosphates brought no observable structural change to the bulk of the electrochemically active fluoride $FeF_3$ of the of ($FeF_3$+lithium phosphate) nanocomposites.
Figure 25:
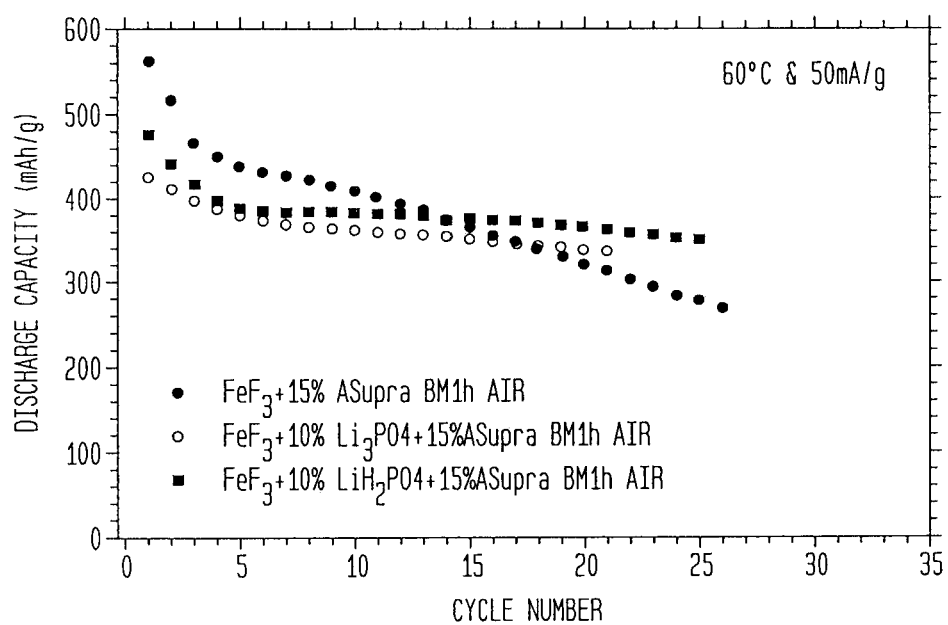
FIG. 25 shows the discharge specific capacity (mAh/g) plotted as a function of cycle number. Electrochemical testing versus lithium metal at 60° C. and 50 mA/g between 1.5 and 4.5V demonstrates the improved capacity retention with the addition of lithium phosphate.

In this embodiment, $FeF_3$ nanocomposites were fabricated with 10 wt % lithium-based phosphates, such as $Li_3PO_4$ and $LiH_2PO_4$, and 15 wt % activated carbon (ASupra). Material (1 gram in total) was loaded into a milling cell and sealed in air in a dry room with ≤1% humidity. FIG. 24 shows XRD patterns of the resulting nanocomposites. It shows that the addition of the lithium phosphates brought no structural change to the bulk of the electrochemically active fluoride $FeF_3$. FIG. 25 shows a plot of discharge capacity (mAh/g) versus cycle number for three such nanocomposites: (1) $FeF_3$ and 15% ASupra milled for 1 hour in air; (2) $FeF_3$ and 10% $Li_3PO_4$ and 15% ASupra milled for 1 hour in air; and (3) $FeF_3$ and 10% $LiH_2PO_4$ and 15% ASupra milled for 1 hour in air. Electrochemical testing versus lithium metal at 60° C. and 50 mA/g between 1.5V and 4.5V revealed that the addition of lithium phosphate improved capacity retention (FIG. 25). The nanocomposite fabricated with lithium hydrogen phosphate $LiH_2PO_4$ exhibited better performance than the nanocomposite fabricated with $Li_3PO_4$.

Example 4.2

Lithium-based Phosphates and Iron Oxyfluoride Nanocomposites

Figure 26:
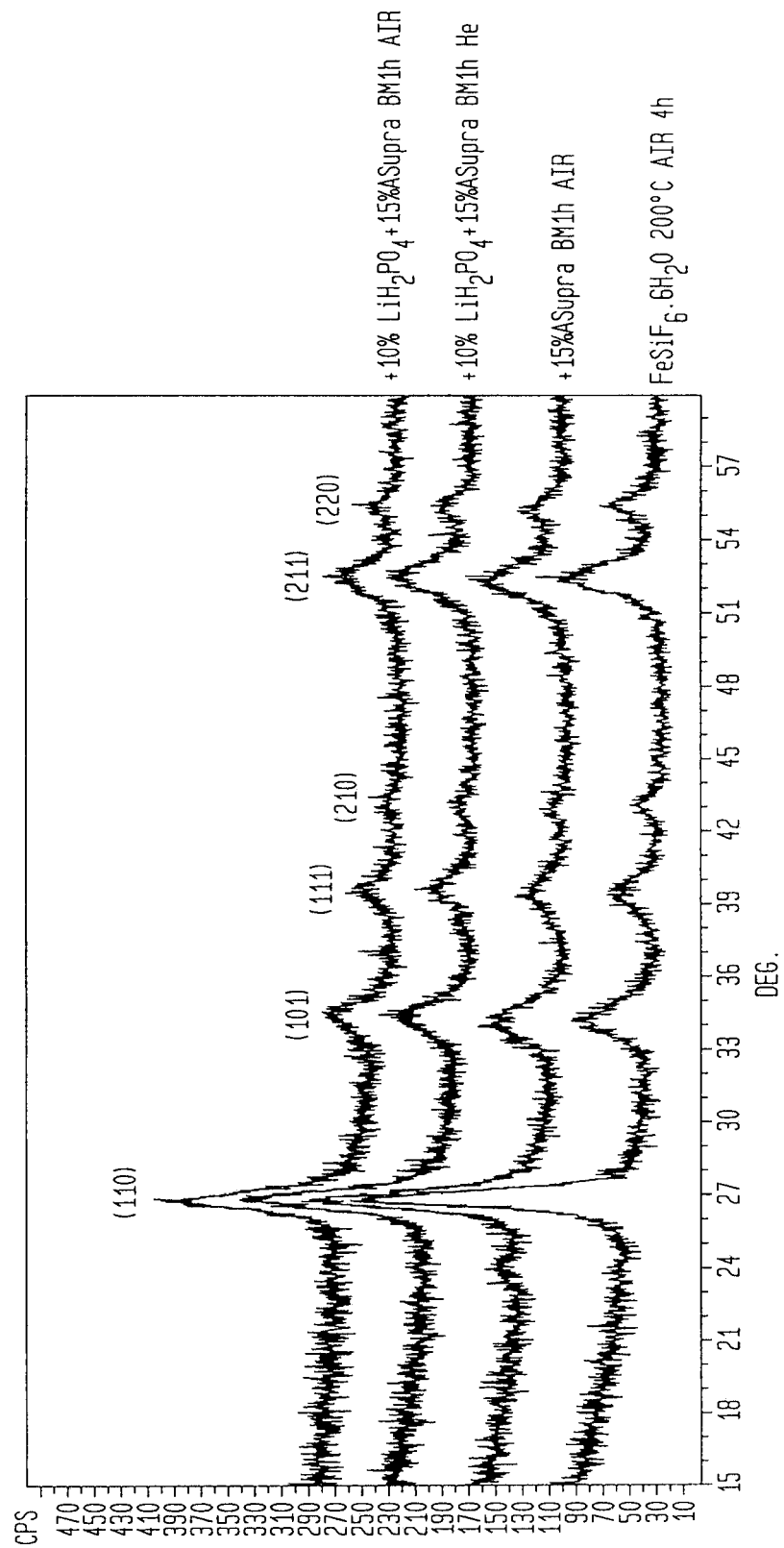
FIG. 26 shows the XRD patterns of the $FeSiF_6$ hydrate annealed in air at 200° C. for 4 hours and after milling with the activated carbon, with and without $LiH_2PO_4$.

In this embodiment, iron oxyfluoride based nanocomposites were fabricated with lithium-based phosphate. $FeSiF_6$ hydrate annealed in air for 4 hours was milled in air and helium with 15 wt % activated carbon ASupra and with 10 wt % $LiH_2PO_4$. Further, the oxyfluoride was milled in air with only 15 wt % activated carbon to assess the impact of $LiH_2PO_4$ on electrochemical performance. The XRD patterns of the iron oxyfluoride nanocomposites obtained with and without $LiH_2PO_4$ shown in FIG. 26 demonstrates the rutile-type structure of the iron oxyfluoride compound is maintained after milling.

Figure 27:
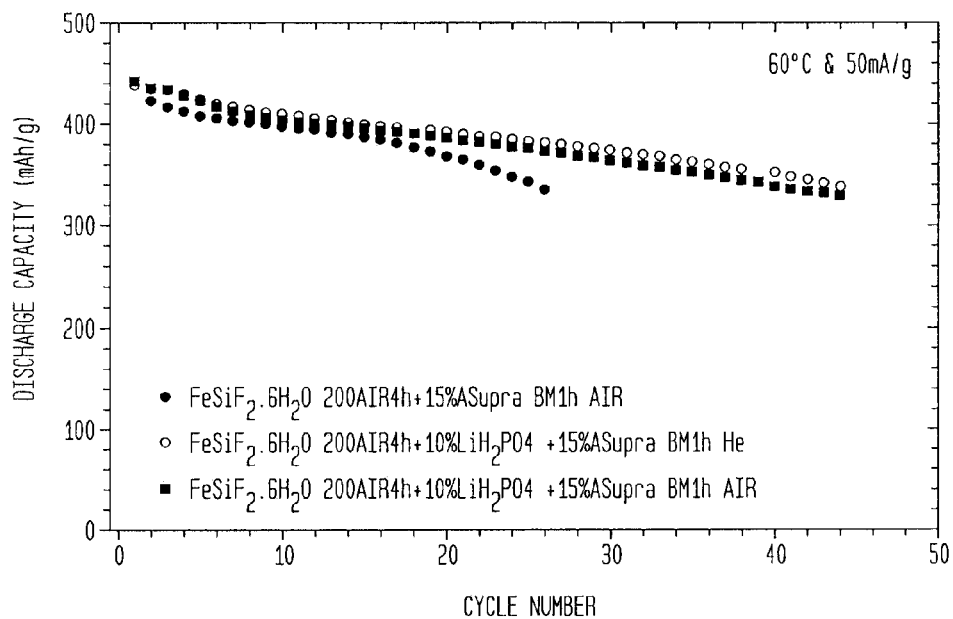
FIG. 27 shows the discharge specific capacity (mAh/g) plotted as a function of cycle number. The addition of 10 wt % $LiH_2PO_4$ improved cycling stability while maintaining discharge capacity in both milling atmospheres.

FIG. 27 is a plot of discharge specific capacity (mAh/g) versus cycle number for three nanocomposites: (1) the $FeSiF_6$ hydrate annealed at 200° C. in air for 4 hours then milled with 15% ASupra for 1 hour in air; (2) the $FeSiF_6$ hydrate annealed at 200° C. in air for 4 hours then milled with 10% $LiH_2PO_4$ and 15% ASupra in He for 1 hour; and (3) the $FeSiF_6$ hydrate annealed at 200° C. in air for 4 hours then milled with 10% $LiH_2PO_4$ and 15% ASupra in air for 1 hour. It shows that the addition of 10 wt % $LiH_2PO_4$ improved cycling stability while maintaining discharge capacity (FIG. 27) in both milling atmospheres. The electrochemical tests were performed at 60° C. and 50 mA/g versus lithium between 1.5V and 4.5V. Furthermore, the use of ammonium hydrogen phosphate precursors ($(NH_4)_2HPO_4$ or $NH_4H_2PO_4$) added in similar amounts and manner as above resulted in notable improvements.

Example 4.3

Lithium-based Phosphates Iron (Oxy)Fluoride Nanocomposites

Figure 28:
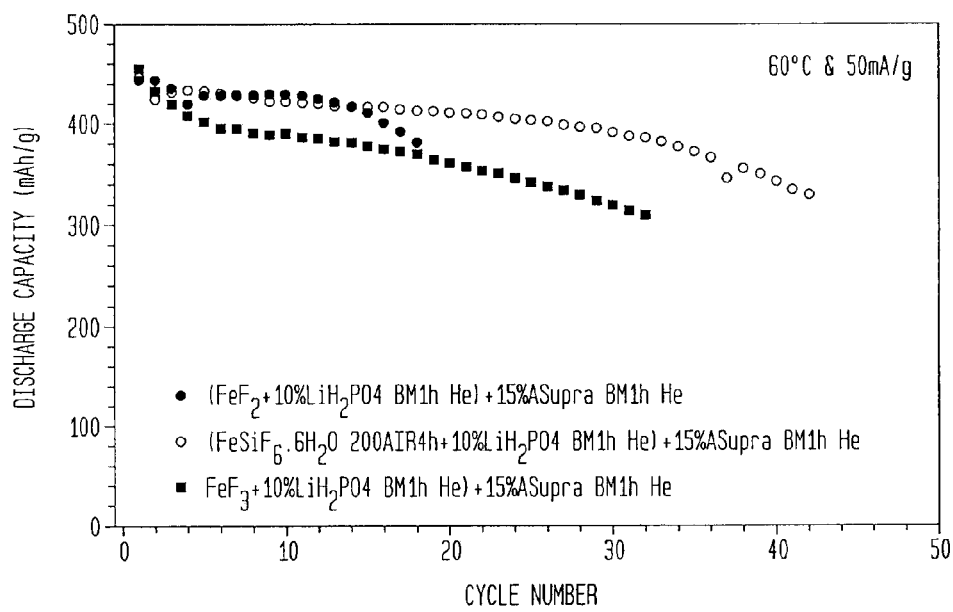
FIG. 28 shows the discharge specific capacity (mAh/g) of the $FeF_3$, $FeF_2$ and iron oxyfluoride-based composites milled with $LiH_2PO_4$ plotted as a function of cycle number. The oxyfluoride demonstrated the best electrochemical performance.

In this embodiment, three types of nanocomposites were fabricated by mechanical milling. (1) A solution fabrication process based $FeO_xF_y$, iron oxyfluoride (2) commercial $FeF_2$ and (3) commercial $FeF_3$ were respectively milled with 10 wt % $LiH_2PO_4$. First, material (1 gram) was loaded in a milling cell and sealed in a He filled glove box. Second, the resulting nanocomposite (0.56 g) was milled with 15 wt % activated carbon ASupra, also in He, for 1 hour. The obtained samples were tested electrochemically versus lithium metal at 60° C. under a constant current of 50 mAh/g between 1.5V and 4.5V. FIG. 28 is a plot of the discharge specific capacity (mAh/g) versus cycle number. It shows that the oxyfluoride exhibits better electrochemical performance than the pure fluorides. As observed for the nanocomposites fabricated with 15% carbon without any phosphate, the addition of oxygen into the fluoride structure was demonstrated to improve cycling stability while maintaining high capacity compared to pure iron fluoride.

Example 5

Utilization of VC Additive

In this embodiment, a $FeO_xF_{2-x}$-nanocomposite with a c-lattice parameter of 3.073±0.01 Å (corresponding approximately to the $FeO_{0.85}F_{1.15}$ composition) was cycled versus lithium at 60° C. under a constant current of 50 mA/g between 1.5V and 4.5V. The $FeO_xF_{2-x}$ material was obtained after milling an oxyfluoride fabricated from the solution fabrication process by annealing the $FeSiF_6$ hydrate in air at 200° C. for 4 hours. After a 1 hour mill in air with 15% activated carbon, the sample was submitted to a 300° C. heat-treatment in air for 2 hours. Electrochemical testing was performed using a (1) 1M $LiPF_6$ in EC:DMC (50:50 vol. %) as electrolyte, (2) electrolyte and 1 wt % VC used as additive and (3) electrolyte and 2 wt % VC used as additive. FIG. 29 shows a plot of discharge specific capacity (mAh/g) versus cycle number. It shows that the VC additive in these concentrations greatly improves cycle life. Higher concentrations of VC slightly lower discharge capacity.

Example 6

Metal Sulfides and Iron and Iron Oxyfluoride Nanocomposites

In this embodiment, nanocomposites were fabricated from iron fluoride and iron oxyfluorides milled with 10-20% metal sulfides and 15% activated carbon (ASupra). Metal sulfides included $FeS_2$ and $NiS_2$. Milling of the iron fluorides occurred in helium while the oxyfluorides were milled in air. The iron fluoride $FeF_2$ used in this embodiment was obtained commercially while the iron oxyfluoride was synthesized following the solution fabrication process.

All cells were tested versus lithium metal at 60° C. under a constant current of 50 mA/g between 1.5 and 4.5V.

Figure 32:
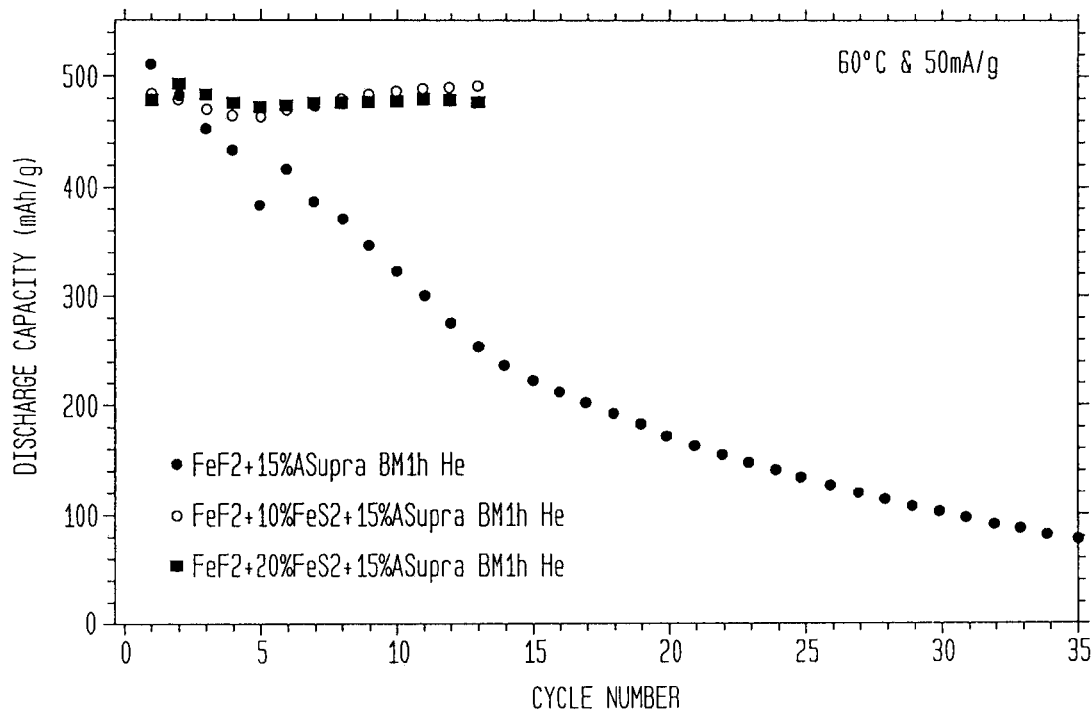
FIG. 32 shows the discharge specific capacity (mAh/g) plotted as a function of cycle number for three nanocomposites obtained by milling commercial $FeF_2$ with 15% activated carbon along with 0, 10 and 20 wt % $FeS_2$, respectively for one hour in He. The addition of metal sulfide provided improved capacity retention while maintaining or improving discharge capacity compared to those nanocomposites fabricated with activated carbon only.

FIG. 32 shows the discharge (i.e., specific) capacity (mAh/g) plotted as a function of cycle number for three nanocomposites: (1) commercially obtained $FeF_2$ milled with 15% activated carbon (ASupra BM) for 1 hour in He; (2) commercially obtained $FeF_2$ milled with 10% $FeS_2$ and 15% activated carbon (ASupra BM) for 1 hour in He; and (3) commercially obtained $FeF_2$ milled with 20% $FeS_2$ and 15% activated carbon (ASupra BM) for 1 hour in He.

FIG. 32 shows that the addition of metal sulfide provided improved capacity retention while maintaining or improving discharge capacity compared to those nanocomposites fabricated with activated carbon only.

Figure 33:
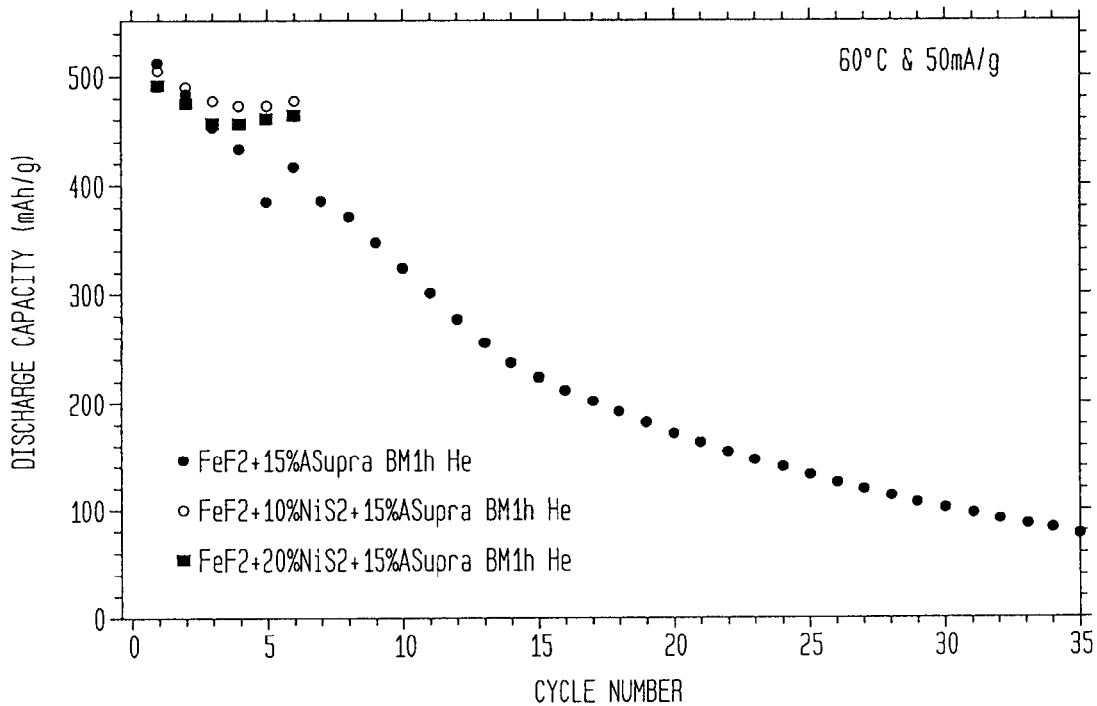
FIG. 33 shows the discharge specific capacity (mAh/g) plotted as a function of cycle number for three nanocomposites obtained by milling commercial $FeF_2$ with 15% activated carbon along with 0, 10 and 20 wt % $NiS_2$, respectively for one hour in He. The addition of metal sulfide provided improved capacity retention while maintaining or improving discharge capacity compared to those nanocomposites fabricated with activated carbon only.

FIG. 33 shows the discharge (i.e., specific) capacity (mAh/g) plotted as a function of cycle number for three nanocomposites: (1) commercially obtained $FeF_2$ milled with 15% activated carbon (ASupra BM) for 1 hour in He; (2) commercially obtained $FeF_2$ milled with 10% $NiS_2$ and 15% activated carbon (ASupra BM) for 1 hour in He; and (3) commercially obtained $FeF_2$ milled with 20% $NiS_2$ and 15% activated carbon (ASupra BM) for 1 hour in He.

FIG. 33 shows that the addition of metal sulfide provided improved capacity retention while maintaining or improving discharge capacity compared to those nanocomposites fabricated with activated carbon only.

Figure 34:
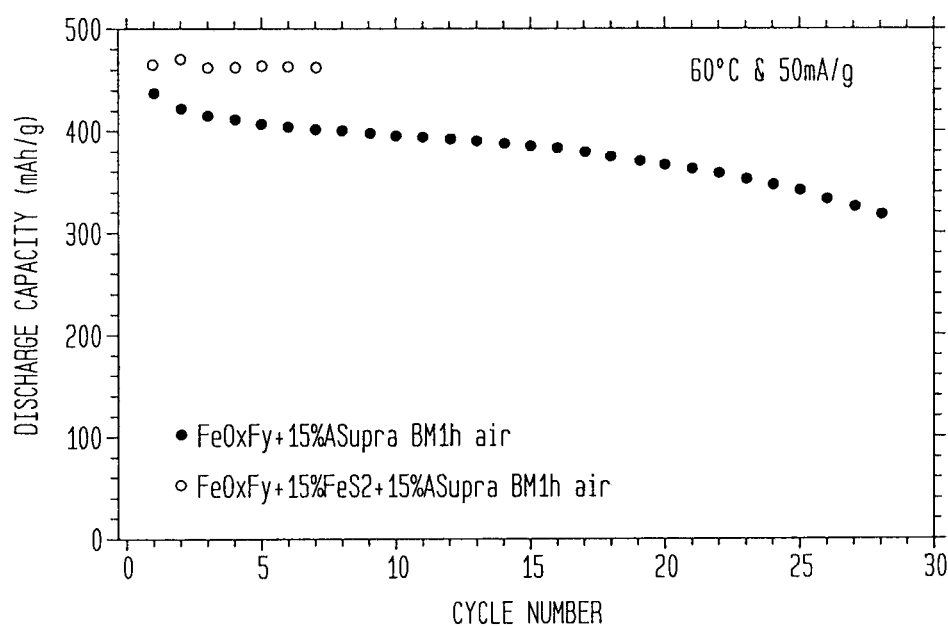
FIG. 34 shows the discharge specific capacity (mAh/g) plotted as a function of cycle number for two oxyfluoride-based nanocomposites obtained by milling in air for 1 h with 15% activated carbon, with and without the addition of 10 wt % $FeS_2$. The addition of metal sulfide provided improved capacity retention while maintaining or improving discharge capacity compared to the nanocomposite fabricated without the metal sulfide.

FIG. 34 shows the discharge (i.e., specific) capacity (mAh/g) plotted as a function of cycle number for two nanocomposites: (1) iron oxyfluoride obtained with the solution fabrication process milled with 15% activated carbon (ASupra BM) for 1 hour in air; and (2) iron oxyfluoride obtained with the solution fabrication process milled with 10% $FeS_2$ and 15% activated carbon (ASupra BM) for 1 hour in air. FIG. 34 shows that the addition of metal sulfide provided improved capacity retention while maintaining or improving discharge capacity compared to the nanocomposite fabricated without the metal sulfide.

In all the examples, the addition of metal sulfide provided improved capacity retention while maintaining or improving discharge capacity compared to nanocomposites fabricated with activated carbon only. Further studies of the metal sulfides added to the iron fluorides and oxyfluorides demonstrated the presence of metal sulfates. The investigation of metal and inorganic sulfates including iron sulfate ($Fe_2(SO_4)_3$) and ammonium hydrogen sulfate ($NH_4HSO_4$) also showed improved cycling stability compared to nanocomposites fabricated with activated carbon only.

The invention has been described with reference to embodiments to illustrate the principles of the invention but not to limit the invention to the particular embodiments illustrated. Modifications and alterations may occur to others upon reading and understanding the preceding detailed description. It is intended that the scope of the invention be construed as including all modifications and alterations that may occur to others upon reading and understanding the preceding detailed description insofar as they come within the scope of the following claims or equivalents thereof.

We claim:

1. An electrochemical cell comprising a negative electrode, a positive electrode material and a separator disposed between the negative electrode and the positive electrode material, wherein the positive electrode material comprises: (i) a composite comprising an iron and fluoride containing compound, wherein the iron and fluoride containing compound is an iron oxyfluoride compound of the formula FeO$_x$F$_{2-y}$, where 0<y.ltoreq.1 and where 0<x.ltoreq.1; and (ii) a conductive matrix comprising an ionic conductive matrix, an electronic conductive matrix or a combination thereof.

2. The electrochemical cell according to claim 1, wherein the iron and fluoride containing compound further comprises at least one additional metal.

3. The electrochemical cell according to claim 2, wherein the at least one additional metal is selected from the group consisting of Li, Mn, Ni, Co, Cu, Ti, V, Cr, Ag, Bi, Sn, Sb, Pb, Mo, and Nb.

4. The electrochemical cell according to claim 1, wherein the iron and fluoride containing compound is an iron oxyfluoride nanocrystallite.

5. The electrochemical cell according to claim 4, wherein the iron oxyfluoride nanocrystallite has a primary domain size from about 1 nm to about 100 nm.

6. The electrochemical cell according to claim 1, wherein x=y.

7. The electrochemical cell according to claim 1, wherein the conductive matrix is an electronic conductive matrix comprising carbon.

8. The electrochemical cell according to claim 1, wherein the conductive matrix is a mixed conductor.

9. The electrochemical cell according to claim 1, wherein the conductive matrix is a metal oxide.

10. The electrochemical cell according to claim 1, wherein the conductive matrix is a metal sulfide.

11. The electrochemical cell according to claim 1, wherein the conductive matrix is a metal sulfate.

12. The electrochemical cell according to claim 1, wherein the conductive matrix is an inorganic phosphate.

13. The electrochemical cell according to claim 1, wherein the conductive matrix is iron phosphate.

14. The electrochemical cell according to claim 1, wherein the conductive matrix is iron fluorophosphate.

15. The electrochemical cell according to claim 1, wherein the conductive matrix is lithium iron phosphate.

16. The electrochemical cell according to claim 1, wherein the conductive matrix is lithium iron fluorophosphate.

17. The electrochemical cell according to claim 1, wherein the iron oxyfluoride compound is of tetragonal rutile structure and has a "c" lattice parameter less than 3.30 .ANG.

18. A composition for use as a positive electrode material for an electrochemical energy storage cell comprising a composite, the composite having a compound comprising: (i) an iron material; (ii) a fluoride material; (iii) an additional metal material; and (iv) a conductive matrix, wherein the conductive matrix is a mixed conductor, wherein the iron material and the fluoride material are an iron oxyfluoride compound of the formula $FeO_xF_{2-y}$, where $0 < y \leq 1$ and where $0 < x \leq 1$.

19. The composition according to claim 18, wherein the additional metal material is selected from the group consisting of Li, Mn, Ni, Co, Cu, Ti, V, Cr, Ag, Bi, Sn, Sb, Pb, Mo, and Nb.

20. The composition according to claim 18, wherein the compound is characterized by a primary domain size of less than about 100 nm.

21. The composition according to claim 18, wherein the compound is a nanocrystallite.

22. The composition according to claim 18, wherein the compound further comprises (v) an oxygen material.

23. A composition for use as a positive electrode material for an electrochemical energy storage cell comprising a composite, the composite having a compound comprising: (i) an iron material; (ii) a fluoride material; (iii) an additional metal material; and (iv) a conductive matrix, wherein the conductive matrix comprises a carbon material, wherein the iron material and the fluoride material are an iron oxyfluoride compound of the formula $FeO_xF_{2-y}$, where $0 < y \leq 1$ and where $0 < \leq 1$.

24. The composition according to claim 23, wherein the conductive matrix is an amorphous carbon matrix.

25. The composition according to claim 23, wherein the carbon material is activated carbon.

26. The composition according to claim 23, wherein the carbon material is formed by a mechanomilling process.

* * * * *